United States Patent
Endo et al.

(10) Patent No.: US 10,468,683 B2
(45) Date of Patent: Nov. 5, 2019

(54) CONDUCTIVE PASTE AND MIXTURE PASTE FOR LITHIUM ION BATTERY POSITIVE ELECTRODE

(71) Applicants: KANSAI PAINT CO., LTD., Hyogo (JP); TOYOTA JIDOSHA KABUSHIKI KAISHA, Aichi-ken (JP)

(72) Inventors: Koji Endo, Kanagawa (JP); Atsuya Kato, Kanagawa (JP); Atsushi Tsukamoto, Kanagawa (JP); Atsunao Hiwara, Kanagawa (JP); Hideki Hagiwara, Aichi-ken (JP); Koji Takahata, Aichi-ken (JP); Akira Saito, Aichi-ken (JP); Machiko Abe, Aichi-ken (JP); Yuichi Ito, Aichi-ken (JP); Kentaro Komabayashi, Aichi-ken (JP)

(73) Assignees: KANSAI PAINT CO., LTD., Hyogo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 228 days.

(21) Appl. No.: 15/628,719

(22) Filed: Jun. 21, 2017

(65) Prior Publication Data
US 2017/0373319 A1 Dec. 28, 2017

(30) Foreign Application Priority Data

Jun. 22, 2016 (JP) .................. 2016-123450

(51) Int. Cl.
| | |
|---|---|
| *H01M 4/62* | (2006.01) |
| *H01M 4/20* | (2006.01) |
| *C01D 15/02* | (2006.01) |
| *C08F 14/08* | (2006.01) |
| *H01M 4/04* | (2006.01) |
| *H01M 4/13* | (2010.01) |
| *H01M 10/0525* | (2010.01) |
| *H01M 4/02* | (2006.01) |

(52) U.S. Cl.
CPC ........... *H01M 4/622* (2013.01); *C01D 15/02* (2013.01); *C08F 14/08* (2013.01); *H01M 4/0416* (2013.01); *H01M 4/13* (2013.01); *H01M 4/20* (2013.01); *H01M 4/625* (2013.01); *H01M 10/0525* (2013.01); *H01M 2004/028* (2013.01)

(58) Field of Classification Search
CPC ....... H01M 10/0525; H01M 2004/028; H01M 4/0416; H01M 4/13; H01M 4/20; H01M 4/622; H01M 4/625
See application file for complete search history.

(56) References Cited

U.S. PATENT DOCUMENTS

| | | | |
|---|---|---|---|
| 6,077,628 A | 6/2000 | Takechi et al. | |
| 6,573,004 B1 | 6/2003 | Igarashi et al. | |
| 6,632,565 B2 * | 10/2003 | Nemoto | H01M 4/62 429/199 |
| 9,385,374 B2 * | 7/2016 | Hellring | H01M 4/623 |
| 2014/0127571 A1 | 5/2014 | Moroishi et al. | |
| 2016/0197339 A1 | 7/2016 | Tanjo et al. | |
| 2016/0204415 A1 | 7/2016 | Takanashi et al. | |
| 2016/0380270 A1 | 12/2016 | Lee et al. | |
| 2017/0005363 A1 * | 1/2017 | Nakagawa | H01M 4/364 |
| 2017/0309916 A1 | 10/2017 | Toyoda et al. | |

FOREIGN PATENT DOCUMENTS

| | | |
|---|---|---|
| EP | 1 184 927 | 3/2002 |
| JP | 7-122297 | 5/1995 |
| JP | 11-250915 | 9/1999 |
| JP | 2001-196065 | 7/2001 |
| JP | 2007-280830 | 10/2007 |
| JP | 2012-48917 | 3/2012 |
| JP | 2013-89485 | 5/2013 |
| JP | 2014-120381 | 6/2014 |
| JP | 2014-193986 | 10/2014 |
| JP | 2014-193996 | 10/2014 |
| JP | 2016-051566 | 4/2016 |
| KR | 10-2015-0077321 | 7/2015 |
| KR | 2015-0123826 | 11/2015 |
| WO | 2015/029525 | 3/2015 |
| WO | 2016/084364 | 6/2016 |

OTHER PUBLICATIONS

Office Action dated Jul. 20, 2018 in corresponding Korean Application No. 2017-0077312, with English translation.
Extended European Search Report dated Nov. 10, 2017 in European Application No. 17001058.1.
Dreger et al., "Method Development for Quality Control of Suspensions for Lithium-Ion Battery Electrodes", Industrial & Engineering Chemistry Research, 56(9):2466-2474 (2017).
Communication pursuant to Article 94(3) EPC dated Aug. 8, 2019 in corresponding European Patent Application No. 17001058.1.

* cited by examiner

*Primary Examiner* — Carlos Barcena
(74) *Attorney, Agent, or Firm* — Wenderoth, Lind & Ponack, L.L.P.

(57) ABSTRACT

The present invention provides a conductive paste for positive electrodes of lithium-ion batteries and a mixture paste for positive electrodes of lithium-ion batteries that are inhibited from increasing in viscosity and gelling, and that have an easy-to-apply viscosity. The conductive paste of the present invention contains a dispersion resin (A), polyvinylidene fluoride (B), conductive carbon (C), a solvent (D), and a dehydrating agent (E).

13 Claims, No Drawings

CONDUCTIVE PASTE AND MIXTURE PASTE FOR LITHIUM ION BATTERY POSITIVE ELECTRODE

TECHNICAL FIELD

The present invention relates to a polyvinylidene fluoride-containing solvent-based conductive paste for positive electrodes of lithium-ion batteries, and a polyvinylidene fluoride-containing solvent-based mixture paste for positive electrodes of lithium-ion batteries.

BACKGROUND ART

A lithium-ion secondary battery is one type of nonaqueous electrolyte secondary battery, and is a secondary battery in which lithium ions in the electrolyte are responsible for electrical conduction. A lithium-ion secondary battery has excellent characteristics, such as high energy density, excellent charged energy-retention characteristics, and a small memory effect, i.e., apparent capacity reduction. Thus, lithium-ion secondary batteries are used in a wide range of fields, such as cellular phones, smartphones, personal computers, hybrid automobiles, and electric automobiles.

A lithium-ion secondary battery mainly comprises a positive-electrode plate, a negative-electrode plate, a separator that insulates the positive- and negative-electrode plates, and a non-aqueous electrolyte solution. The positive-electrode plate is obtained by forming a positive electrode mixture layer on a surface of a positive electrode core. This positive electrode mixture layer may be produced by applying a positive electrode mixture paste to a surface of a positive electrode core, followed by drying. The positive electrode mixture paste is obtained by mixing an electrode active material with a conductive paste containing a conductive auxiliary agent (e.g., carbon), a binder, and a solvent.

As described above, the production of a positive electrode mixture layer is performed by applying a positive electrode mixture paste to a surface of a positive electrode core. Thus, the positive electrode mixture paste, as well as the conductive paste, which is a component of the positive electrode mixture paste, is required to have a low viscosity. Under such circumstances, methods for adding a dispersant to allow a conductive auxiliary agent to be dispersed in a conductive paste or a dispersion liquid are known (Patent Literature 1 and Patent Literature 2). A method for using a specific vinyl alcohol-based polymer as a binder is also known (Patent Literature 3). Polyvinylidene fluoride is useful for incorporating into such a conductive paste as a binder for binding a metal oxide and a collector. However, particularly when a polyvinylidene fluoride-containing conductive paste contains a basic substance, problems such as viscosity increase and gelation of the paste occur during storage.

CITATION LIST

Patent Literature

PTL 1: JP2013-89485A
PTL 2: JP2014-193986A
PTL 3: JPH11-250915A
PTL 4: JP2001-196065A
PTL 5: JP2014-120381A
PTL 6: JP2012-048917A

SUMMARY OF INVENTION

Technical Problem

The problem to be solved by the present invention is to provide a conductive paste for positive electrodes of lithium-ion batteries and a mixture paste for positive electrodes of lithium-ion batteries, the pastes being inhibited from increasing in viscosity and gelling, and having an easy-to-apply viscosity.

Solution to Problem

Under such circumstances, the present inventors conducted extensive research. As a result, the inventors found that the above problem can be solved by using a conductive paste containing a dispersion resin (A), polyvinylidene fluoride (B), conductive carbon (C), and a solvent (D) with a dehydrating agent (E). The present invention has been accomplished based on this novel finding.

More specifically, the present invention provides the following Items:

Item 1. A conductive paste for positive electrodes of lithium-ion batteries comprising a dispersion resin (A), polyvinylidene fluoride (B), conductive carbon (C), a solvent (D), and a dehydrating agent (E).

Item 2. The conductive paste for positive electrodes of lithium-ion batteries according to Item 1, wherein the dehydrating agent (E) has a boiling point or sublimation point of 200° C. or less.

Item 3. The conductive paste for positive electrodes of lithium-ion batteries according to Item 1 or 2, wherein the dispersion resin (A) comprises a polycyclic aromatic hydrocarbon group-containing resin (A1).

Item 4. The conductive paste for positive electrodes of lithium-ion batteries according to any one of Items 1 to 3, wherein the dispersion resin (A) comprises a polyvinyl alcohol resin (A2).

Item 5. The conductive paste for positive electrodes of lithium-ion batteries according to any one of Items 1 to 4, wherein the conductive carbon (C) comprises acetylene black.

Item 6. The conductive paste for positive electrodes of lithium-ion batteries according to any one of Items 1 to 5, wherein the conductive carbon (C) comprises graphite.

Item 7. The conductive paste for positive electrodes of lithium-ion batteries according to any one of Items 1 to 6, wherein the solvent (D) comprises N-methyl-2-pyrrolidone.

Item 8. The conductive paste for positive electrodes of lithium-ion batteries according to any one of Items 1 to 7, further comprising an acidic compound.

Item 9. The conductive paste for positive electrodes of lithium-ion batteries according to any one of Items 1 to 8, wherein the conductive paste has a water content of less than 1.0 mass %.

Item 10. A method for producing the conductive paste for positive electrodes of lithium-ion batteries according to any one of Items 1 to 9, comprising mixing and/or dispersing a pigment in an atmosphere at a dew point of 10° C. or less.

Item 11. A mixture paste for positive electrodes of lithium-ion batteries comprising the conductive paste according to any one of Items 1 to 9 and an electrode active material mixed with the conductive paste.

Item 12. The mixture paste for positive electrodes of lithium-ion batteries according to Item 11, wherein the mixture paste has a lithium hydroxide content of less than 1.5 mass %, based on the mass of the polyvinylidene fluoride (B).

Item 13. An electrode for positive electrodes of lithium-ion batteries obtained by using the mixture paste for positive electrodes of lithium-ion batteries according to Item 11 or 12.

Item 14. A lithium ion battery comprising the electrode for positive electrodes of lithium-ion batteries according to Item 13.

Advantageous Effects of Invention

Based on the above structural features, the conductive paste for positive electrodes of lithium-ion batteries and the mixture paste for positive electrodes of lithium-ion batteries according to the present invention are inhibited from increasing in viscosity and gelling, compared with conventional conductive or mixture pastes for positive electrodes of lithium-ion batteries. In particular, even when a basic compound is incorporated into the conductive paste for positive electrodes of lithium-ion batteries or the mixture paste for positive electrodes of lithium-ion batteries, the resulting paste maintains an easy-to-apply viscosity, and is inhibited from increasing in viscosity and gelling.

Although the mechanism of how the conductive paste for positive electrodes of lithium-ion batteries or the mixture paste for positive electrodes of lithium-ion batteries increases its viscosity or the mechanism of gelation of these pastes is not yet clear, the following mechanism, for example, can be inferred. In the conductive paste or mixture paste for positive electrodes of lithium-ion batteries comprising polyvinylidene fluoride (B), the acidity of protons adjacent to fluorine groups in polyvinylidene fluoride is very high due to the electron withdrawing property of the fluorine groups. Therefore, deprotonation proceeds easily, particularly under basic conditions. This deprotonation is considered to proceed particularly easily when the conductive or mixture paste contains water. Anions are present on carbons after deprotonation and the anions promote the elimination of fluorine groups, which leads to formation of double bonds in the main chains of polyvinylidene fluoride molecules. Polyvinylidene fluoride molecules containing such double bonds are polymerized to form a macromolecular compound, which increases the viscosity and leads to gelation. In particular, because the electrode active material in the mixture paste contains lithium hydroxide of a basic substance, a remarkable viscosity increase and gelation occur in the mixture paste. In the present invention, a combination of components (A) to (D) with a dehydrating agent (E) presumably inhibits polymerization of polyvinylidene fluoride molecules, which inhibits viscosity increase and gelation of the conductive paste or mixture paste for positive electrodes of lithium-ion batteries.

In contrast, Patent Literature (PTL) 1 to Patent Literature 3 nowhere disclose that a dehydrating agent is incorporated into a conductive paste for positive electrodes of lithium-ion batteries. Patent Literature 4 merely discloses a mixture paste for positive electrodes of lithium-ion batteries, which is an aqueous dispersion. The technical idea disclosed in Patent Literature 4 is completely different from the present invention, which contains a dehydrating agent. Patent Literature 5 merely discloses a mixed electrode for a non-aqueous electrolyte battery comprising a first active material, a second active material, which is more reactive with water than the first active material, an organic moisture scavenger, and an organic binder, which binds the first active material and the second active material. Patent Literature 5 is silent as to incorporating a dispersion resin other than an organic binder. Patent Literature 6 discloses a positive electrode comprising a collector and a positive electrode mixture layer formed on the collector, the positive electrode mixture layer comprising a positive electrode active material and a binder, the binder comprises a first polymer and a second polymer, the polymer being selected from carbonyl-containing copolymers containing a vinylidene fluoride monomer unit and an unsaturated dibasic acid monoester monomer unit, and vinylidene fluoride homopolymers with a mean molecular weight of 650 thousand or more to 1 million or less, the second polymer contains a vinylidene fluoride monomeric unit and a tetrafluoroethylene monomeric unit, the mixing ratio between the first polymer and the second polymer ({the mass of the second polymer/(the mass of the first polymer+the mass of the second polymer)}×100 mass %) being in the range of 30 mass % or more to 70 mass % or less, and the total thickness of the collector and the positive electrode mix layer being 10-fold to 20-fold larger than the thickness of the collector. Patent Literature 6 does not disclose that a dispersion resin other than the "carbonyl-containing copolymers containing a vinylidene fluoride monomeric unit and an unsaturated dibasic acid monoester monomeric unit" and "vinylidene fluoride" is incorporated into a positive electrode mixture.

DESCRIPTION OF EMBODIMENTS

Embodiments of the present invention will now be described in detail below. However, the present invention is not limited to these embodiments. It should be understood that the invention includes various modifications that may be practiced without departing from the spirit of the invention.

In this specification, the term "(meth)acrylate" refers to acrylate and/or methacrylate, and the term "(meth)acrylic acid" refers to acrylic acid and/or methacrylic acid. The term "(meth)acryloyl" refers to acryloyl and/or methacryloyl. The term "(meth)acrylamide" refers to acrylamide and/or methacrylamide. The "polymerizable unsaturated monomer" refers to a polymerizable unsaturated group-containing monomer that is capable of undergoing radical polymerization. Examples of the polymerizable unsaturated group include (meth)acryloyl, acrylamide, vinyl, allyl, (meth)acryloyloxy, vinyl ether, and the like.

Conductive Paste for Lithium Ion Battery Positive Electrodes

The present invention provides a conductive paste for positive electrodes of lithium-ion batteries comprising a dispersion resin (A), polyvinylidene fluoride (B), conductive carbon (C), a solvent (D), and a dehydrating agent (E).

Dispersion Resin (A)

The dispersion resin (A) that can be used in the conductive paste of the present invention includes a wide variety of resins used for dispersing a conductive auxiliary agent in the field of conductive pastes for positive electrodes of lithium-ion batteries to which the present invention belongs.

Examples of such resins include polycyclic aromatic hydrocarbon group-containing resins (A1), polyvinyl alcohol resins (A2), and the like. In the present invention, the dispersion resin (A) preferably contains both a polycyclic aromatic hydrocarbon group-containing resin (A1) and a polyvinyl alcohol resin (A2).

Polycyclic Aromatic Hydrocarbon Group-Containing Resin (A1)

The polycyclic aromatic hydrocarbon group-containing resin (A1) that can be contained in the conductive paste for positive electrodes of lithium-ion batteries of the present invention is characterized in that it is obtained by copolymerization of a monomer mixture comprising a polycyclic aromatic hydrocarbon-containing monomer (A1-1) in an amount of 1 to 70 mass %, based on the total solids content of the monomer mixture. Thus, in the present invention, the resin (A1) may be rephrased as a copolymer of a monomer mixture comprising a polycyclic aromatic hydrocarbon-containing monomer (A1-1) in an amount of 1 to 70 mass %, based on the total solids content of the monomer mixture.

Examples of the types of the above resin (A1) include acrylic resins, polyester resins, epoxy resins, polyether resins, alkyd resins, urethane resins, silicone resins, polycarbonate resins, silicate resins, chlorine-based resins, fluorine-based resins, and composite resins thereof. In particular, acrylic resins are preferable.

In this specification, the term "derivative" refers to a compound obtained by modifying a small portion (or small portions) in the molecule of a compound by functional group introduction, atomic substitution, or other chemical reactions. For example, a compound obtained by introducing into naphthalene one or more functional groups, such as alkyl, alkoxy, hydroxyl, sulfonic acid, carboxyl, amino, nitro, halogen, aryloxy, alkylthio, and arylthio, is referred to as a naphthalene derivative.

Polycyclic Aromatic Hydrocarbon-Containing Monomer (A1-1)

Examples of polycyclic aromatic hydrocarbons of the polycyclic aromatic hydrocarbon-containing monomer (A1-1) that can be contained in the dispersion resin of the present invention include a naphthalene ring-, anthracene ring-, triphenylene ring-, tetraphene ring-, tetracene ring-, chrysene ring-, pyrene ring-, pentacene ring-, hexacene ring-, heptacene ring-, coronene ring-, or kekulene ring-containing hydrocarbon group, and derivatives thereof. In a preferable embodiment of the present invention, the polycyclic aromatic hydrocarbon-containing monomer (A1-1) may be a polymerizable unsaturated monomer that contains a naphthalene ring-containing hydrocarbon group from among the polycyclic aromatic hydrocarbon groups mentioned above, i.e., a naphthyl-containing polymerizable unsaturated monomer or a derivative thereof (A1-2). Examples of the naphthyl-containing polymerizable unsaturated monomer or a derivative thereof (A1-2) include a naphthyl-containing polymerizable unsaturated monomer represented by Formula (3) described below or a derivative thereof (A1-1-2), and the like.

The polycyclic aromatic hydrocarbon-containing monomer (A1-1) is preferably a polycyclic aromatic hydrocarbon-containing polymerizable unsaturated monomer (A1-1-1) represented by the following Formula (2)

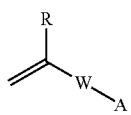

Formula (2)

(wherein R is hydrogen or methyl, A is polycyclic aromatic hydrocarbon, and W may or may not be present; when W is present, W is an organic group having 1 to 20 carbon, nitrogen, and/or oxygen atoms, and when W is not present, W directly binds to A). The "polymerizable unsaturated monomer" refers to a polymerizable unsaturated group-containing monomer that is capable of undergoing radical polymerization. Examples of the polymerizable unsaturated group include (meth)acryloyl, acrylamide, vinyl, allyl, (meth)acryloyloxy, vinyl ether, and the like.

Specific examples of the polycyclic aromatic hydrocarbon-containing polymerizable unsaturated monomer (A1-1-1) include vinylnaphthalene, naphthyl (meth)acrylate, naphthylalkyl (meth)acrylate, vinylanthracene, anthracenyl (meth)acrylate, anthracenylalkyl (meth)acrylate, vinylpyrene, pyrenyl (meth)acrylate, pyrenylalkyl (meth)acrylate, vinylchrysene, vinylnaphthacene, vinylpentacene, and derivatives thereof. Examples also include a reaction product obtained by reacting a polymerizable unsaturated monomer containing a reactive functional group, such as glycidyl or isocyanate, with a polycyclic aromatic hydrocarbon group containing a functional group that reacts with such a reactive functional group. Any combination of functional groups is suitably used as long as they react with each other. More preferable combinations include a combination of a carboxyl group and a glycidyl group, a combination of an amino group and a glycidyl group, and a combination of a hydroxyl group and an isocyanate group. Specific examples include a combination of glycidyl(meth)acrylate and 1-naphthyl acetic acid, a combination of 2-(meth)acryloyloxyethyl isocyanate and 1-naphthol, a combination of 2-(meth)acryloyloxyethyl isocyanate and 1-(2-naphthyl) ethanol, and the like. These may be used alone, or in a combination of two or more.

Of these, the polycyclic aromatic hydrocarbon-containing polymerizable unsaturated monomer (A1-1-1) is preferably a naphthyl-containing polymerizable unsaturated monomer represented by the following Formula (3) or a derivative thereof (A1-1-2)

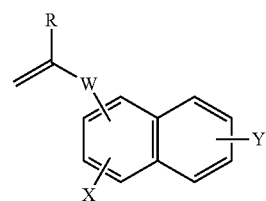

Formula (3)

(wherein R is hydrogen or methyl, X and Y may be identical or different and each represents hydrogen, alkyl, alkoxy, alkoxycarbonyloxy, phosphoryloxy, hydroxy, sulfonic acid, carboxyl, amino, nitro, halogen, aryloxy, alkylthio, or arylthio; and when W is present, W is an organic group having 1 to 20 carbon, nitrogen, and/or oxygen atoms, or a single bond).

Examples of the naphthyl-containing polymerizable unsaturated monomer or a derivative thereof (A1-1-2) include vinylnaphthalene, naphthyl (meth)acrylate, naphthylalkyl (meth)acrylate, derivatives thereof, and the like. These may be used alone, or in a combination of two or more.

Of these, naphthyl (meth)acrylate or a derivative thereof (A1-1-2) is preferably naphthyl (meth)acrylate or a derivative thereof (A1-1-3) represented by the following Formula (4).

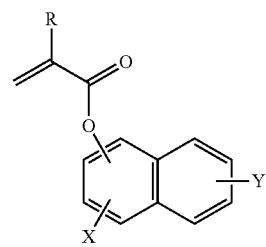

Formula (4)

(wherein R is hydrogen or methyl, X and Y may be identical or different and each represents hydrogen, alkyl, alkoxy, hydroxyl, sulfonic acid, carboxyl, alkoxycarbonyloxy, phosphoryloxy, amino, nitro, halogen, aryloxy, alkylthio, or arylthio).

Examples of the naphthyl (meth)acrylate or a derivative thereof (A1-1-3) include 1-naphthyl (meth)acrylate, 2-naphthyl (meth)acrylate, derivatives thereof, and the like. These may be used alone, or in a combination of two or more.

Of these, the naphthyl (meth)acrylate or a derivative thereof (A1-1-3) is preferably 4-substituted-1-naphthyl (meth)acrylate (A1-1-4) represented by the following Formula (5).

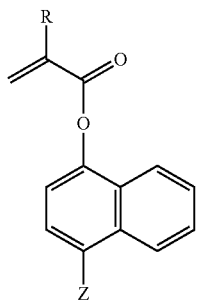

Formula (5)

(wherein R is hydrogen or methyl, and Z is hydroxyl or $C_{1-8}$ alkoxy).

When Z, which is a substituent in Formula (5) above, is alkoxy, the carbon number of the alkoxy group is usually 1 to 8, preferably 1 to 4, more preferably 1 to 2, and particularly preferably 1.

Examples of the 4-substituted-1-naphthyl (meth)acrylate (A1-1-4) include 4-methyl-1-naphthyl (meth)acrylate, 4-ethyl-1-naphthyl (meth)acrylate, 4-methoxy-1-naphthyl (meth)acrylate, 4-ethoxy-1-naphthyl (meth)acrylate, 4-hydroxy-1-naphthyl (meth)acrylate, 2-methoxy-4-hydroxy-1-naphthyl (meth)acrylate, 2-ethoxy-4-hydroxy-1-naphthyl (meth)acrylate, 2-hydroxy-4-methoxy-1-naphthyl (meth)acrylate, 2-hydroxy-4-ethoxy-1-naphthyl (meth)acrylate, 4-methoxycarbonyloxy-1-naphthyl(meth)acrylate, 4-phenoxycarbonyloxy-1-naphthyl (meth)acrylate, 4-phosphoryloxy-1-naphthyl (meth)acrylate, and derivatives thereof. These may be used alone, or in a combination of two or more.

It is unknown specifically why the polycyclic aromatic hydrocarbon-containing dispersion resin of the present invention is effective in terms of the dispersibility and stability of a pigment. For example, a pigment that has an aromatic ring becomes stable presumably due to π-π interactions between the pigment and dispersion resin. The π-π interactions refer to dispersion force between aromatic rings, and are also called stacking interactions since two aromatic rings become stable when disposed in the manner of stacked coins.

It is unknown specifically why the substituent of the 4-substituted-1-naphthyl(meth)acrylate (A1-1-4) is effective in terms of the dispersibility and stability of a pigment. For example, having a substituent presumably increases the electrostatic potential of an aromatic ring, increasing the affinity with a pigment.

Polymerizable Unsaturated Monomers Other than the Polycyclic Aromatic Hydrocarbon-Containing Polymerizable Unsaturated Monomer (A1-1)

The dispersion resin (A1) of the present invention is obtained by copolymerization of the polycyclic aromatic hydrocarbon-containing polymerizable unsaturated monomer (A1-1) and a polymerizable unsaturated monomer other than (A1-1). The polymerizable unsaturated monomer other than the polycyclic aromatic hydrocarbon-containing polymerizable unsaturated monomer (A1-1) is not particularly limited as long as it is usually used in the synthesis of acrylic resin. Examples include alkyl (meth)acrylates of 3 carbon atoms or less, such as methyl (meth)acrylate, ethyl (meth)acrylate, n-propyl (meth)acrylate, and isopropyl (meth)acrylate; alkyl or cycloalkyl (meth)acrylates, such as n-butyl (meth)acrylate, i-butyl (meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate; isobornyl-containing polymerizable unsaturated compounds, such as isobornyl (meth)acrylate; adamantyl-containing polymerizable unsaturated compounds, such as adamantyl (meth)acrylate; aromatic-ring-containing polymerizable unsaturated monomers, such as benzyl (meth)acrylate, styrene, α-methylstyrene, and vinyltoluene; hydroxy-containing polymerizable unsaturated monomers, such as monoesterified products of (meth)acrylic acids with dihydric alcohols having 2 to 8 carbon atoms (such as 2-hydroxyethyl (meth)acrylate, 2-hydroxypropyl (meth)acrylate, 3-hydroxypropyl (meth)acrylate, and 4-hydroxybutyl (meth)acrylate), ε-caprolactone-modified compounds of these monoesterified products of (meth)acrylic acids with dihydric alcohols having 2 to 8 carbon atoms, N-hydroxymethyl(meth)acrylamide, allyl alcohol, and (meth)acrylates having hydroxy-terminated polyoxyalkylene chains; carboxyl-containing polymerizable unsaturated monomers, such as (meth)acrylic acid, maleic acid, crotonic acid, and β-carboxyethyl acrylate; nitrogen-containing polymerizable unsaturated monomers having no urethane bond, such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and addition products of glycidyl (meth) acrylate with amines; urethane bond-containing polymerizable unsaturated monomers, such as a reaction product of an isocyanate-containing polymerizable unsaturated monomer and a hydroxy-containing compound, and a reaction product of a hydroxy-containing polymerizable unsaturated monomer and an isocyanate-containing compound; epoxy-containing polymerizable unsaturated monomers, such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, and allyl glycidyl ether; (meth)acrylates having alkoxy-terminated polyoxyethylene chains; sulfonic acid group-containing polymerizable unsaturated monomers, such as 2-acrylamido-2-methylpropane-sulfonic acid, 2-sulfoethyl (meth)acrylate, allylsulfonic acid, and 4-styrenesulfonic acid, and sodium salts and ammonium salts of these sulfonic acids; phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate; alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane; perfluoroalkyl (meth)acrylates, such as perfluorobutylethyl (meth)acrylate, and perfluorooctylethyl (meth)acrylate; fluorinated alkyl-containing polymerizable unsaturated monomers, such as fluoroolefins; polymerizable unsaturated monomers having a photo-polymerizable functional group, such as maleimide; (meth)acrylates having alkoxy-terminated polyoxyethylene chains; polymerizable unsaturated monomers having two or more polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-tris-hydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, and divinylbenzene; and the like. These may be used alone, or in a combination of two or more.

Of these, it is preferable to contain at least one styrene, and it is more preferable to contain styrene in an amount of 5 to 65 mass %, based on the total amount of the polymerizable unsaturated monomer components.

To form a steric repelling layer of the resin and achieve dispersion paste stability, at least one polyalkylene glycol macromonomer may be contained. The polyalkylene glycol macromonomer is a nonionic polymerizable unsaturated monomer represented by the following Formula (6). Specific examples of such a monomer include polyethylene glycol (meth)acrylate, polypropylene glycol (meth)acrylate, methoxy polyethylene glycol(meth)acrylate, ethoxypolyethylene glycol(meth)acrylate, and the like. Of these, in particular, polyethylene glycol(meth)acrylate and polypropylene glycol(meth)acrylate are preferable.

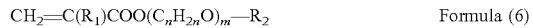

$$CH_2=C(R_1)COO(C_nH_{2n}O)_m-R_2 \qquad \text{Formula (6)}$$

(wherein $R_1$ is hydrogen or methyl, $R_2$ is hydrogen or $C_{1-4}$ alkyl, m is an integer of 4 to 60, in particular 4 to 55, and n is an integer of 2 to 3; in the formula, m-number of oxyalkylene units ($C_nH_{2n}O$) may be the same or different).

It is preferable to contain at least one (meth)acrylamide compound. As the (meth)acrylamide compound, known compounds may be used without particular limitation. Specific examples include acrylamide, methacrylamide, 2-acrylamide-2-methylpropanesulfonic acid, N-methylacrylamide, N-methyl methacrylamide, N-methylolacrylamide butyl ether, N-methylol methacrylamide butyl ether, N-ethylacrylamide, N-ethylmethacrylamide, N-n-propylacrylamide, N-n-propylmethacrylamide, N-isopropylacrylamide, N-iso-propylmethacrylamide, N-cyclopropylacrylamide, N-cyclopropyl methacrylamide, diacetone acrylamide, diacetone methacrylamide, N-hydroxymethylacrylamide, N-hydroxymethyl methacrylamide, N-hydroxyethylacrylamide, N-hydroxypropylacrylamide, N-hydroxybutylacrylamide, N-hydroxypentylacrylamide, N-hydroxymethyl-N-ethylacrylamide, N-methyl-N-hydroxyethylacrylamide, N,N-dihydroxymethyl acrylamide, N,N-dihydroxyethyl acrylamide, N,N-dihydroxypropyl acrylamide, N,N-dihydroxybutyl acrylamide, N,N-dihydroxypentyl acrylamide, N-hydroxymethyl methacrylamide, N-hydroxyethyl methacrylamide, N-hydroxypropyl methacrylamide, N-hydroxybutyl methacrylamide, N-hydroxypentyl methacrylamide, N-hydroxymethyl-N-ethyl methacrylamide, N-methyl-N-hydroxyethyl methacrylamide, N,N-dihydroxymethyl methacrylamide, N,N-dihydroxyethyl methacrylamide, N,N-dihydroxypropyl methacrylamide, N,N-dihydroxybutyl methacrylamide, N,N-dihydroxypentyl methacrylamide, N,N-dihydroxybutyl (meth)acrylamide, and N-[tris(hydroxymethyl)methyl]acrylamide, N,N-dimethylacrylamide, N,N-dimethylmethacrylamide, N,N-diethylacrylamide, N,N-diethylmethacrylamide, N-methyl-N-ethylacrylamide, N-methyl-N-ethylmethacrylamide, N-methylol acrylamide methyl ether, N-methylol methacrylamide methyl ether, N-methylol acrylamide ethyl ether, N-methylol methacrylamide ethyl ether, N-methylol acrylamide propyl ether, N-methylol methacrylamide propyl ether, N-methylol acrylamide butyl ether, N-methylol methacrylamide butyl ether, N,N-dimethylaminoethyl (meth)acrylamide, N,N-dimethylaminopropyl (meth)acrylamide, N,N-diethylaminoethyl (meth)acrylamide, N,N-dipropylaminoethyl (meth)acrylamide, and like amino-containing (meth)acrylamide compounds, methacryloyloxyethyl trimethyl ammonium chloride (Acryester DMC, trade name, produced by Mitsubishi Rayon Co., Ltd.) and like quaternary-ammonium-base-containing acrylamide compounds, acryloyl morpholine, and the like. These may be used alone, or in a combination of two or more.

Of these, it is preferable to use a (meth)acrylamide compound represented by the following Formula (7):

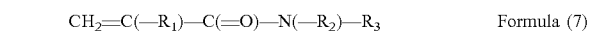

$$CH_2=C(-R_1)-C(=O)-N(-R_2)-R_3 \qquad \text{Formula (7)}$$

$R_1$ in Formula (7) is hydrogen or methyl, $R_2$ and $R_3$ may be identical or different and each may preferably be at least one member selected from a hydrogen atom, hydroxy-containing organic group, or alkyl group. Further, it is more preferable that both or one of $R_2$ and $R_3$ represent a hydroxy-containing organic group. Specifically, for example, at least one member selected from the group consisting of N-hydroxymethyl(meth)acrylamide, N-hydroxyethyl(meth)acrylamide, N-hydroxypropyl(meth)acrylamide, N-hydroxybutyl(meth)acrylamide, N-hydroxymethyl-N-ethyl(meth)acrylamide, N-methyl-N-hydroxyethyl (meth)acrylamide, N-ethyl-N-hydroxyethyl(meth)acrylamide, N-hydroxyethyl-N-butyl(meth)acrylamide, N-hydroxybutyl-N-butyl (meth)acrylamide, N,N-dihydroxymethyl(meth)acrylamide, N,N-dihydroxyethyl(meth)acrylamide, N,N-dihydroxypropyl(meth)acrylamide, N,N-dihydroxybutyl(meth)acrylamide, and N-[tris(hydroxymethyl)methyl]acrylamide is particularly preferable.

Synthesis of Dispersion Resin (A1) Containing a Polycylic Aromatic Hydrocarbon Group The dispersion resin (A1) contained in the conductive paste of the present invention may be obtained by a known radical-polymerization method, such as solution polymerization in an organic solvent in the presence of a radical polymerization initiator, or emulsion polymerization in an aqueous medium in the presence of a radical polymerization initiator.

Examples of radical polymerization initiators used in polymerization include like peroxide-based polymerization initiators such as cyclohexanone peroxide, 3,3,5-trimethyl-cyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)valerate, cumenehydroperoxide, 2, 5-dimethylhexane-2, 5-dihydroperoxide, 1,3-bis(tert-butylperoxy-m-isopropyl)benzene, 2,5-dimethyl-2,5-di(tert-butylperoxy) hexane, diisopropylbenzene peroxide, tert-butylcumyl peroxide, decanoyl peroxide, lauroyl peroxide, benzoyl peroxide, 2,4-dichlorobenzoyl peroxide, di-tert-amyl peroxide, bis(tert-butylcyclohexyl)peroxydicarbonate, tert-butylperoxy benzoate, 2,5-dimethyl-2,5-di(benzoylperoxy)hexane, and tert-butyl peroxy-2-ethylhexanoate; and azo-based polymerization initiators such as 2,2'-azobis(isobutyronitrile), 1,1-azobis(cyclohexane-1-carbonitrile), azocumene, 2,2'-azobis(2-methylbutyronitrile), 2,2'-azobisdimethylvaleronitrile, 4,4'-azobis(4-cyanovaleric acid), 2-(t-butylazo)-2-cyanopropane, 2,2'-azobis(2,4,4-trimethylpentane), 2,2'- azobis(2-methylpropane), and dimethyl 2,2'-azobis(2-methylpropionate). These may be used alone, or in a combination of two or more.

The solvents used in the above polymerization or dilution are not particularly limited. Examples of useful solvents include water, organic solvents, mixtures thereof, and the like. Examples of organic solvents include hydrocarbon solvents, such as n-butane, n-hexane, n-heptane, n-octane, cyclopentane, cyclohexane, and cyclobutane; aromatic-based solvents, such as toluene and xylene; ketone-based solvents, such as methyl isobutyl ketone; ether-based solvents, such as n-butyl ether, dioxane, ethylene glycol monomethyl ether, ethylene glycol monoethyl ether, ethylene glycol monobutyl ether, and diethylene glycol; ester-based solvents, such as ethyl acetate, n-butyl acetate, isobutyl acetate, ethylene glycol monomethyl ether acetate, and butylcarbitol acetate; ketone-based solvents, such as methyl ethyl ketone, methyl isobutyl ketone, and diisobutyl ketone; alcohol-based solvents, such as ethanol, isopropanol, n-butanol, sec-butanol, and isobutanol; amide-based solvents, such as Equamide (trade name, produced by Idemitsu Kosan Co., Ltd., amide-based solvent), N,N-dimethylformamide, N,N-dimethylacetamide, N-methylformamide, N-methylacetamide, N-methylpropionamide, N-methyl-2-pyrrolidone; and other known solvents. These may be used alone, or in a combination of two or more.

Examples of usable methods for solution polymerization in an organic solvent include a method comprising mixing a polymerization initiator, polymerizable unsaturated monomer components, and an organic solvent, and performing heating while stirring; and a method comprising introducing an organic solvent in a reaction vessel to prevent an increase in the temperature of the system due to the reaction heat, and adding polymerizable unsaturated monomer components and a polymerization initiator dropwise separately or in combination over a predetermined time with stirring at a temperature of 60 to 200° C. while optionally blowing an inert gas, such as nitrogen or argon.

In general, polymerization may be performed for about 1 to 10 hours. After the polymerization of each step, an additional catalyst step may be optionally performed that comprises heating a reaction vessel, while adding a polymerization initiator dropwise.

The dispersion resin of the present invention obtained as above has a weight average molecular weight within a range of preferably 1,000 to 100,000, and more preferably 3,000 to 50,000.

After the completion of the synthesis, the dispersion resin (A1) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, alcohol solvents, and the like.

The method for solvent removal may be, for example, heating at ordinary pressure, or reducing the pressure. For solvent replacement, a replacement solvent may be introduced at any step of before, during, or after solvent removal.

In this specification, the number average molecular weight and weight average molecular weight are a polystyrene equivalent molecular weight that is determined from the retention time (retention volume) measured by gel permeation chromatography (GPC) based on the retention time (retention volume) of a standard polystyrene with a known molecular weight measured under the same conditions. More specifically, the measurement is performed using a gel permeation chromatography apparatus "HLC8120GPC" (trade name, produced by Tosoh Corporation) together with four columns "TSKgel G-4000HXL," "TSKgel G-3000HXL," "TSKgel G-2500HXL," and "TSKgel G-2000XL," (trade names, all produced by Tosoh Corporation) under the following conditions: mobile phase, tetrahydrofuran; measurement temperature, 40° C.; flow rate, 1 mL/min; and detector, RI.

Polyvinyl Alcohol Resin (A2)

Examples of the polyvinyl alcohol resin (A2) include a resin obtained by copolymerization of a polymerizable unsaturated group-containing monomer (A2a-1) of the following Formula (1) with another polymerizable unsaturated monomer (herein sometimes simply referred to as polyvinyl alcohol resin (A2a) or resin (A2a)), sulfonic acid-modified polyvinyl alcohol resin (A2b) (herein sometimes simply referred to as polyvinyl alcohol resin (A2b) or resin (A2b)), and polyvinyl alcohol resin (A2c) other than resin (A2a) and resin (A2b) (herein sometimes simply referred to as polyvinyl alcohol resin (A2c) or resin (A2c)):

(1)

(wherein $R_1$, $R_2$, $R_3$, and $R_4$ may be the same or different, and are at least one member selected from the group consisting of hydrogen, hydrocarbon, hydroxyl, and methylol), and at least one of $R_1$, $R_2$, $R_3$, and $R_4$ is hydroxyl, X may or may not be present, when X is present, X is a linking chain comprising one or more atoms). In the present invention, a polyvinyl alcohol resin (A2a) and/or a polyvinyl alcohol resin (A2b) is preferably used as a polyvinyl alcohol resin (A2). Further, using a polyvinyl alcohol resin (A2c) with a polyvinyl alcohol resin (A2a) and/or a polyvinyl alcohol resin (A2b) is more preferable.

Polyvinyl Alcohol Resin (A2a)

The polyvinyl alcohol resin (A2a) is a resin obtained by copolymerization of a polymerizable unsaturated group-containing monomer (A2a-1) of Formula (1) with another polymerizable unsaturated monomer. In the present invention, "a resin containing a polymerizable unsaturated group-containing monomer (A2a-1) as a component" means a resin obtained by (co)polymerization of starting monomers containing a polymerizable unsaturated group-containing monomer (A2a-1). In the present invention, the resin containing monomer X "as a component" means a resin obtained by (co)polymerization of a starting material containing monomer X. The polyvinyl alcohol resin (A2a) is not modified with sulfonic acid, and can be clearly distinguished from a sulfonic acid-modified polyvinyl alcohol resin (A2b).

$R_1$, $R_2$, $R_3$, and $R_4$ in the polymerizable unsaturated group-containing monomer (A2a-1) represented by Formula (1) may be the same or different, and are at least one member selected from the group consisting of hydrogen, hydrocarbon, hydroxyl, and methylol, and at least one (for example, preferably one to three, and more preferably two to three) of $R_1$, $R_2$, $R_3$, and $R_4$ are hydroxyl. X in the monomer represented by Formula (1) may or may not be present. When X is not present, X is a single bond. When X is present, X is a linking chain comprising one or more atoms. The linear chain is not particularly limited. Examples include alkylene (for example, $C_{1-6}$ linear or branched alkenylene), alkenylene (for example, $C_{2-6}$ linear or branched alkenylene containing one or two (preferably one) double bond), alkynylene (for example, $C_{2-6}$ linear or branched alkynylene containing one or two (preferably one) triple bond, hydrocarbon groups such as phenylene and naphtylene (these hydrocarbon groups may be substituted by halogens such as fluorine, chlorine, and bromine), as well as —O—, —(R—O)$_m$—, —(O—R)$_m$—, —(R—O)$_m$—R—, —C(=O)—, —R(—OH)—, —C(=O)—O—, —R—C(=O)—O—, —C(=O)—O—R—, —O(=O)—N(—R)—, —C(=O)—N(—R)—R—, —R—C(=O)—N(—R)—, —R—C(=O)—N(—R)—R—, and the like. (In the above formulas, each R independently represents any substituent, and is preferably hydrogen or alkyl, and m is an integer of 1 or more.) Among these, a single bond (X is not present) or a linking chain selected from a hydrocarbon group, an ester group [—C(=O)—O—], an amide group [—C(=O)—NH—], an amidomethyl group [—C(=O) NH—CH2—] is preferable. A single bond (wherein X is not present) is more preferable.

Specific examples of the monomer (A2a-1) include hydroxyethyl (meth)acrylate, ring-opening products of glycidyl (meth)acrylate, 2-propen-1-ol, 1-propen-1,3-diol, 1-propen-2-ol, 2-methyl-2-propen-1-ol, 2-buten-1-ol, 2-methyl-2-buten-1-ol, 1-methyl-2-buten-1-ol, 2-butene-1, 4-diol, 1-butene-3,4-diol, 2-methyl-2-butene-1,4-diol, 4-pentene-2-ol, 3-pentene-1-ol, 4-pentene-2-ol, 4-pentene-1-ol, 1-pentene-4,5-diol, 2-pentene-1,5-diol, N-hydroxymethyl (meth)acrylamide, N-hydroxyethyl (meth)acrylamide, N-hydroxyisopropyl (meth)acrylamide, N-(1-methyl-2-hydroxyethyl) (meth)acrylamide, 2,3-dihydroxypropyl (meth) acrylamide, 1,2-dihydroxyethyl (meth)acrylamide, and derivatives thereof. These may be used alone, or in a combination of two or more. Among these, monomers containing two or more hydroxyl groups are preferable. The total number of carbon atoms and oxygen atoms in X, $R_3$, and $R_4$ in the monomer (A2a-1) represented by Formula (1) is preferably 3 or more.

The proportion of the polymerizable unsaturated group-containing monomer (A2a-1) in the resin (A2a) is preferably in the range of 0.01 to 20 mass %, more preferably 0.1 to 15 mass %, and particularly preferably 0.5 to 10 mass %. In the present invention, the "proportion of the polymerizable unsaturated group-containing monomer (A2a-1) in the resin (A2a)" means a proportion of the polymerizable unsaturated group-containing monomer (A2a-1) in a monomer mixture used as the starting material of the resin (A2a). Accordingly, the description "the proportion of the polymerizable unsaturated group-containing monomer (A2a-1) in the resin (A2a) is 0.1 to 20 mass %" means that the resin (A2a) is a copolymer of a starting monomer containing 0.1 to 20 mass % of a polymerizable unsaturated group-containing monomer (A2a-1). Similarly, the "proportion of the monomer X in resin Y" means the proportion of the monomer X in a monomer mixture used as a starting material of the resin Y. Accordingly, the sentence "the proportion of the polymerizable unsaturated group-containing monomer X in the resin Y is a mass %" means that the resin Y is a copolymer of a starting monomer containing a mass % of the monomer X.

Another polymerizable unsaturated monomer with which the polymerizable unsaturated group-containing monomer (A2a-1) is polymerized is not particularly limited as long as it is a monomer copolymerizable with the monomer (A2a-1). Specific examples include fatty acid vinyl esters such as vinyl acetate; olefin monomers such as ethylene and propylene; (meth)acryloyl-containing monomers such as alkyl (meth)acrylate; allyl ethers such as allyl glycidyl ether; halogenated vinyl compounds such as vinyl chloride, vinylidene chloride, and vinyl fluoride; vinyl ethers such as alkyl vinyl ethers; and the like. These may be used alone, or in a combination of two or more. Among these, fatty acid vinyl esters (A2a-2) are preferable. Examples of fatty acid vinyl esters (A2a-2) include vinyl formate, vinyl acetate, vinyl propionate, vinyl butyrate, vinyl caprate, vinyl caprylate, vinyl caproate, vinyl laurate, vinyl myristate, vinyl palmitate, vinyl stearate, vinyl pivalate, vinyl octoate, vinyl monochlorate, vinyl benzoate, vinyl cinnamate, vinyl crotonate, divinyl adipate, and derivatives thereof. Among these, vinyl acetate is preferable.

In view of dispersibility and solubility, it is preferable that the resin (A2a) obtained by copolymerization is further saponified to completely or partially hydrolyze fatty acid vinyl ester units into vinyl alcohol units.

The saponification degree is preferably in a range of 50 to 100 mol %, more preferably 70 to 100 mol %, even more preferably 86 to 100 mol %, and particularly preferably 88 to 99.9 mol %. More specifically, the resin (A2a) is particularly preferably formed as a resin comprising a polymerizable unsaturated group-containing monomer (A2a-1), a fatty acid vinyl ester (A2a-2), and a vinyl alcohol (A2a-3) as components, by saponification of a copolymer of at least one polymerizable unsaturated group-containing monomer (A2a-1) and at least one fatty acid vinyl ester (A2a-2).

In general, a higher degree of saponification (higher polarity) results in a higher adsorption onto organic pigments such as carbon, while solubility in solvents (such as NMP) is reduced and a steric repelling layer is not formed, resulting in poor dispersibility. In contrast, in the present invention, the resin (A2a) containing the polymerizable unsaturated group-containing monomer (A2a-1) as a component enhances the dispersibility of the conductive paste. This is presumably for the following reason. Introduction of a specific functional group into a side chain of the resin causes a relatively bulky side chain functional group to form steric hindrance, which lowers the melting point of the resin, whereas hydrogen bonding of a specific hydroxyl group reduces the crystallizability of the resin; therefore, solvent solubility and pigment adsorption are both achieved.

The resin (A2a) may be produced by known polymerization methods. For example, the resin may be produced by solution polymerization in an organic solvent. The methods are not limited to the above, and, for example, bulk polymerization, emulsion polymerization, suspension polymerization, or the like is also applicable. In solution polymerization, either continuous polymerization or batch polymerization may be performed, monomers may be added all at once or in divided portions, and the addition may be performed successively or intermittently.

The polymerization initiator used in solution polymerization is not particularly limited. Specific examples include the following known polymerization initiators: azo compounds, such as azobisisobutyronitrile, azobis-2,4-dimethylvaleronitrile, and azobis(4-methoxy-2,4-dimethylvaleronitrile); peroxides, such as acetyl peroxide, benzoyl peroxide, lauroyl peroxide, acetylcyclohexylsulfonyl peroxide, and 2,4,4-trimethylpentyl-2-peroxyphenoxyacetate; percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy neodecanoate; azobis dimethylvaleronitrile; azobis methoxyvaleronitrile; and the like.

The polymerization reaction temperature is not particularly limited, and may usually be determined within a range of about 30 to 200° C.

The condition for saponification is not particularly limited, and any known methods can be used for saponification. For example, in an alcohol solution such as methanol, an ester portion of the molecule can be hydrolyzed in the presence of an alkali catalyst or an acid catalyst. The alkali catalyst may be, for example, an alkali metal hydroxide, such as sodium hydroxide, potassium hydroxide, sodium methylate, sodium ethylate, or potassium methylate; alcoholate; or the like. The acid catalyst may be, for example, an aqueous solution of an inorganic acid, such as hydrochloric acid or sulfuric acid, or an organic acid, such as p-toluenesulfonic acid. It is desirable to use sodium hydroxide.

The saponification reaction temperature is not particularly limited, and is preferably within a range of 10 to 70° C., and more preferably 30 to 40° C. The reaction time is not particularly limited, and is desirably within a range of 30 minutes to 3 hours.

After the completion of the synthesis, the resin (A2a) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, alcohol solvents, and the like.

The method for solvent removal may be, for example, heating at ordinary pressure or reducing the pressure. For solvent replacement, a replacement solvent may be introduced at any step of before, during, or after solvent removal.

Sulfonic Acid-Modified Polyvinyl Alcohol Resin (A2b)

The sulfonic acid modified polyvinyl alcohol resin (A2b) refers to a polyalcohol resin to which sulfonic acid is imparted by one of the following production methods. The polyvinyl alcohol resin (A2b) does not contain a polymerizable unsaturated group-containing monomer (A2a-1) represented by formula (1), and can be clearly distinguished from the polyvinyl alcohol resin (A2a).

(1) Method comprising copolymerizing a sulfonic acid group- and polymerizable unsaturated group-containing compound with a fatty acid vinyl ester, such as vinyl acetate, and further subjecting the obtained polymer to saponification.
(2) Method comprising Michael addition of vinylsulfonic acid, 2-acrylamide-2-methylpropanesulfonic acid, or the like to a polyvinyl alcohol.
(3) Method comprising heating polyvinyl alcohol with a sulfuric acid compound solution (e.g., an aqueous sulfuric acid solution or an aqueous sodium sulfite solution).
(4) Method comprising acetalizing polyvinyl alcohol with a sulfonic acid group-containing aldehyde compound.
(5) Method of polymerizing a polyvinyl alcohol, comprising allowing a sulfonic acid group-containing alcohol to be present with aldehyde and a functional group-containing compound, such as thiol, as a chain transfer agent.

Although any of the production methods can be suitably used, the method (1) comprising copolymerizing a sulfonic acid group- and polymerizable unsaturated group-containing compound with another polymerizable unsaturated monomer (in particular, a fatty acid vinyl ester, such as vinyl acetate is preferable) and further subjecting the obtained polymer to saponification is preferable.

The compound containing the sulfonic acid group- and polymerizable unsaturated group-containing compound (herein sometimes simply referred to as a sulfonic acid group-containing polymerizable unsaturated monomer) is not particularly limited as long as it is a compound copolymerizable with a fatty acid vinyl ester. Specific examples include olefin sulfonic acids such as vinylsulfonic acid, isoprene sulfonic acid, ethylene sulfonic acid, allylsulfonic acid, and methallylsulfonic acid; sulfoalkyl maleates such as sodium sulfopropyl 2-ethylhexyl maleate, sodium sulfopropyl tridecyl maleate, and sodium sulfopropyl eicosyl maleate; sulfoalkyl (meth)acrylamides such as 2-(meth)acrylamide-2-methylpropanesulfonic acid and sodium N-sulfoisobutylene acrylamide; sulfoalkyl (meth)acrylates such as 3-methacryloyloxypropanesulfonic acid, 4-methacryloyloxybutanesulfonic acid, 3-methacryloyloxy-2-hydroxypropanesulfonic acid, 3-acryloyloxypropanesulfonic acid, sulfoethyl (meth)acrylate, sodium methacylate-4-styrene sulfonate, and sodium 2-sulfoethylacrylate; allyloxybenzenesulfonic acid, methallyloxybenzenesulfonic acid, styrenesulfonic acid, an ammonium salt of oleyl 2-hydroxy-[3-allyloxy]-propyl sulfosuccinate; and the like. These may be used alone, or in a combination of two or more.

In the present invention, the sulfonic acid group may be in the form of a free acid or in the form of an alkali metal salt, such as a sodium salt or potassium salt, or in the form of an ammonium salt.

The proportion of the sulfonic acid group-containing polymerizable unsaturated monomer in the sulfonic acid-modified polyvinyl alcohol resin (A2b) is preferably 0.1 to 10 mass %, and more preferably 0.2 to 5 mass %. In the present invention, the "proportion of the sulfonic acid group-containing monomer in the resin (A2b)" means the content of the sulfonic acid group-containing monomer in the monomer mixture used as a starting material of the resin (A2b). Accordingly, the description "the proportion of the sulfonic acid group-containing monomer in the resin (A2b) is 0.1 to 10 mass %" means that the resin (A2b) is a copolymer of a starting monomer containing 0.1 to 10 mass % of a sulfonic acid group-containing monomer.

As another polymerizable unsaturated monomer that is copolymerized with the sulfonic acid group- and polymerizable unsaturated group-containing compound, any monomer copolymerizable with a sulfonic acid-group containing polymerizable unsaturated monomer can be used as long as it is capable of being copolymerized with a sulfonic acid group-containing polymerizable unsaturated monomer (provided, however, that the monomer is other than the polymerizable unsaturated group-containing monomer (A2a-1)). Specific examples include fatty acid vinyl esters such as vinyl acetate; olefin monomers such as ethylene and propylene; (meth)acryloyl group-containing monomers such as alkyl (meth)acrylate; allyl ethers such as allyl glycidyl ether; halogenated vinyl compounds such as vinyl chloride, vinylidene chloride, and vinyl fluoride; vinyl ethers such as alkyl vinyl ether; and the like. These may be used alone, or in a combination of two or more. Among these, fatty acid vinyl esters are preferable. As fatty acid vinyl esters, one or more types of fatty acid vinyl esters mentioned as examples in the fatty acid vinyl ester (A2a-2) can be preferably used. Among these, vinyl acetate is preferable.

The saponification degree of the sulfonic acid-modified polyvinyl alcohol resin (A2b) is preferably in a range of 30 to 100 mol %, more preferably 50 to 100 mol %, still more preferably 86 to 100 mol %, and particularly preferably 88 to 99.9 mol %.

In general, a higher degree of saponification (higher polarity) enhances the adsorption to inorganic pigments, such as carbon, but reduces the solubility in solvents (such as NMP), thus failing to form a steric repelling layer and resulting in poor dispersibility. In contrast, in the present invention, the sulfonic acid-modified polyvinyl alcohol resin (A2b) enhances the dispersibility of the conductive paste presumably for the following reason. A relatively bulky side chain functional group (a sulfonic acid-containing functional group) formed by introducing a specific functional group into a side chain of the resin becomes steric hindrance, which lowers the melting point of the resin, whereas the highly polar side-chain functional group (a sulfonic acid-containing functional group) can reduce the crystallinity of the resin. Therefore, solvent solubility as well as pigment absorption can be achieved.

The method for polymerizing the resin (A2b) may be the same as the method for polymerizing the resin (A2a).

Polyvinyl Alcohol Resin (A2c) Other than the Resin (A2a) and Resin (A2b)

The dispersion resin (A) that can be used in the conductive paste of the present invention does not contain the polymerizable unsaturated group-containing monomer (A2a-1) and contains a polyvinyl alcohol resin (A2c) having a saponification degree of 30 to 100 mol % and not being modified with sulfonic acid. In the present invention, the "polyvinyl alcohol resin not containing the polymerizable unsaturated group-containing monomer (A2a-1)" means a polyvinyl alcohol resin obtained by (co)polymerization of a starting monomer not containing a polymerizable unsaturated group-containing monomer (A2a-1). The "polyvinyl alcohol resin not modified with sulfonic acid" means a polyvinyl alcohol resin obtained by (co)polymerization of a starting monomer not containing a sulfonic acid group, or a polyvinyl alcohol resin to which a sulfonic acid group is not added by the above-mentioned modification or the like.

The polyvinyl alcohol resin (A2c) above may be obtained by a known polymerization method, for example, by polymerization of a fatty acid vinyl ester represented by vinyl acetate, followed by hydrolysis.

As the fatty acid vinyl ester, one or more fatty acid vinyl esters mentioned as examples of fatty acid vinyl esters (A2a-2) can be suitably used. Among these, vinyl acetate is preferable.

The polyvinyl alcohol resin (A2c) can also be obtained by copolymerization with a polymerizable unsaturated monomer other than fatty acid vinyl esters (provided, however, the polymerizable unsaturated monomer is a monomer other than the polymerizable unsaturated group-containing monomer (A2a-1) and sulfonic acid group-containing polymerizable unsaturated monomer). The polymerizable unsaturated monomer capable of being copolymerized with a fatty acid vinyl ester is not particularly limited as long as it is other than the polymerizable unsaturated group-containing monomer (A2a-1) and sulfonic acid group-containing polymerizable unsaturated monomer. Examples include olefin monomers, such as ethylene and propylene; (meth)acryloyl group-containing monomers, such as alkyl (meth)acrylate, 2-hydroxyethyl (meth)acrylate, and glycidyl (meth)acrylate; allyl ethers, such as allyl glycidyl ether; halogenated vinyl compounds, such as vinyl chloride, vinylidene chloride, and vinyl fluoride; vinyl ethers, such as alkyl vinyl ether and 4-hydroxyvinyl ether; and the like. These may be used alone, or in a combination of two or more.

The following describes the present invention, mainly referring to vinyl acetate; however, the present invention is not limited thereto.

The polyvinyl alcohol resin (A2c) may be produced by known polymerization methods. For example, a method comprising subjecting vinyl acetate to solution polymerization in an alcohol-based organic solvent to produce polyvinyl acetate and then saponifying the polyvinyl acetate can be used. Usable methods are not limited to the above, and, for example, bulk polymerization, emulsion polymerization, suspension polymerization, or the like is also applicable. In solution polymerization, either continuous polymerization or batch polymerization may be performed, monomers may be added all at once or in divided portions, and the addition may be performed successively or intermittently.

The polymerization initiator used in solution polymerization is not particularly limited. The following known polymerization initiators may be used: azo compounds, such as azobisisobutyronitrile, azobis-2,4-dimethylvaleronitrile, and azobis(4-methoxy-2,4-dimethylvaleronitrile); peroxides, such as acetyl peroxide, benzoyl peroxide, lauroyl'peroxide, acetylcyclohexylsulfonyl peroxide, and 2,4,4-trimethylpentyl-2-peroxyphenoxyacetate; percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy neodecanoate; azobisdimethylvaleronitrile; azobismethoxyvaleronitrile; and the like.

The polymerization reaction temperature is not particularly limited, and may usually be determined within a range of about 30 to 220° C.

The saponification conditions in the production of polyvinyl alcohol resin (A2c) are not particularly limited, and saponification may be performed by a known method. In general, saponification may be performed by hydrolyzing an ester moiety in a molecule in an alcohol solution, such as methanol, in the presence of an alkali catalyst or an acid catalyst.

The alkali catalyst may be, for example, an alkali metal hydroxide, such as sodium hydroxide, potassium hydroxide, sodium methylate, sodium ethylate, and potassium methylate; alcoholate; and the like. The acid catalyst may be, for example, an aqueous solution of an inorganic acid, such as hydrochloric acid and sulfuric acid, and an organic acid, such as p-toluenesulfonic acid. It is desirable to use sodium hydroxide.

The saponification reaction temperature is not particularly limited, and is preferably within a range of 10 to 70° C., and more preferably 30 to 40° C. The reaction time is not particularly limited, and is desirably within a range of 30 minutes to 3 hours.

The thus-obtained polyvinyl alcohol resin preferably has a polymerization degree of 100 to 4,000, and more preferably 100 to 3,000. Further, the saponification degree is preferably 30 to 100 mol %, and more preferably 32 to 85 mol %.

In the present invention, the saponification degree of polyvinyl alcohol resin (A2c) refers to the percentage (mol %) of hydrolyzed ester bonds in the structural units derived from fatty acid vinyl ester contained in the polyvinyl alcohol resin (A2c). The saponification degree may be measured by completely saponifying a polyvinyl alcohol resin with an alkaline substance, such as sodium hydroxide, and measuring the amount of the obtained fatty acid salt (e.g., acetate salt) (whether saponification is perfectly completed may be confirmed by infrared absorption spectrometry).

The polyvinyl alcohol resin (A2c) above may be a commercially available product.

After the completion of the synthesis, the polyvinyl alcohol resin (A2c) may be subjected to solvent removal and/or solvent replacement to obtain a solid or a resin solution whose solvent has been replaced with any solvent. The replacement solvent is preferably N-methyl-2-pyrrolidone, N-ethyl-2-pyrrolidone, propylene glycol monomethyl ether, alcohol solvents, and the like.

The method for solvent removal may be, for example, heating at ordinary pressure or reducing the pressure. For solvent replacement, a replacement solvent may be introduced at any step of before, during, or after solvent removal.

In the conductive paste of the present invention, a combination of a resin (A2a) and/or (A2b) of high polarity with a polyvinyl alcohol resin (A2c) of relatively low polarity renders both resins compatible with each other, and a mixture of the resins achieves both solvent solubility and pigment adsorption.

When the dispersion resin (A) comprises a polycyclic aromatic hydrocarbon group-containing resin (A1) and a polyvinyl alcohol resin (A2), the proportions are not particularly limited. From the viewpoint of viscosity and cell performance, it is preferable that the solids content of the polycyclic aromatic hydrocarbon group-containing resin (A1) be usually 5 to 95 parts by mass, and preferably 10 to 50 parts by mass, and the solids content of the polyvinyl alcohol resin (A2) be usually 5 to 95 parts by mass, and preferably 50 to 90 parts by mass, based on 100 parts by mass of the solids content of the dispersion resin (A). When the polyvinyl alcohol (A2) contains both of the polyvinyl alcohol resin (A2a) and/or polyvinyl alcohol resin (A2b) with the polyvinyl alcohol resin (A2c), the proportions are not particularly limited. From the viewpoint of viscosity and cell performance, it is preferable that the solids of the polyvinyl alcohol resin (A2c) be usually 5 to 100 parts by mass, and preferably 15 to 70 parts by mass, based on 100 parts by mass of the total solids content of the polyvinyl alcohol resin (A2a) and resin (A2b).

Other Resins

The dispersion resin (A) may optionally contain a resin other than the resin (A1) and resin (A2). Examples of resins other than the resin (A1) and resin (A2) include acrylic resins, polyester resins, epoxy resins, polyether resins, alkyd resins, urethane resins, silicone resins, polycarbonate resins, silicate resins, chlorine-based resins, and fluorine-based resins other than polyvinylidene fluoride (PVDF), polyvinylpyrrolidone resins, polyvinyl alcohol resins, polyvinyl acetal resins, composite resins thereof, and the like, other than the resin (A1) and resin (A2). These resins may be used alone, or in a combination of two or more. Of these, a combined use with at least one resin selected from the group consisting of polyvinyl acetal resins, polyvinylpyrrolidone resins, and fluororesins is preferable. These resins may be incorporated into a conductive paste as a resin for pigment dispersion or as a resin added after pigment dispersion.

Polyvinylidene Fluoride (B)

As the polyvinylidene fluoride, a wide variety of polyvinylidene fluorides that are used in the field of conductive pastes for positive electrodes of lithium-ion batteries to which the present invention belongs can be used. The weight average molecular weight of polyvinylidene fluoride is not particularly limited. It is usually preferable that the polyvinylidene fluoride has a weight average molecular weight of 10,000 to 2,000,000, more preferably 50,000 to 1,700,000, and particularly preferably 100,000 to 1,500,000.

Conductive Carbon (C)

Examples of the conductive carbon (C) include acetylene black, furnace black, thermal black, channel black, Ketjen black, Vulcan, carbon nanotube, graphene, vapor growth carbon fiber (VGCF), graphite, and the like, with acetylene black, graphite, and the like being preferable, and acetylene black and the like being more preferable. In a preferable embodiment of the present invention, the conductive carbon (C) may comprise both acetylene black and graphite. These conductive carbon materials may be used alone, or in a combination of two or more.

Solvent (D)

As the solvent (D), the solvents mentioned above that are used for polymerization of the polycyclic aromatic hydrocarbon group-containing resin (A3) or dilution may be suitably used. Specific preferable examples of the solvent (D) include N-methyl-2-pyrrolidone, N-ethyl-2-pyrrolidone, propylene glycol monomethyl ether, methanol, and the like, with N-methyl-2-pyrrolidone being preferable. These solvents may be used alone, or in a combination of two or more.

The conductive paste of the present invention preferably has a water content of less than 1.0 mass %, more preferably less than 0.7 mass %, and still more preferably less than 0.5 mass %, based on the total amount of the paste. In the present invention, the water content of the conductive paste is measured by the Karl Fischer coulometric titration method. Specifically, the measurement can be performed using a Karl Fischer moisture analyzer (produced by Kyoto Electronics Manufacturing Co., Ltd., product name: MKC-610), and setting a moisture evaporator (produced by Kyoto Electronics, product name: ADP-611) provided in the Karl Fischer moisture analyzer to a temperature of 130° C. When the water content of the conductive paste is 1.0 mass % or more, the result is, for example, poor storage stability. Accordingly, the conductive paste of the present invention is said to be a substantially non-aqueous conductive paste.

Dehydrating Agent (E)

As the dehydrating agent (E) used in the present invention, any known compound that has a dehydrating action can be used without limitation. A solid dehydrating agent that does not dissolve in a conductive paste solvent (D), or a dehydrating agent that dissolves in a solvent (D) may be used. Specific examples include solid dehydrating agents such as zeolite, silica gel, calcium oxide, molecular sieve, activated alumina, barium oxide, calcium hydride, and sodium sulfate; phosphoric acid esters such as trimethyl phosphate, tri-2-propyl phosphate, tributyl phosphate, and tetraisopropyl ethylene phosphonate; phosphine oxides such as tributylphosphine oxide, trioctylphosphine oxide, and triphenylphosphine oxide; orthoesters such as methyl orthoformate, ethyl orthoformate, methyl orthoacetate, ethyl orthoacetate, and ethyl orthobenzoate; acid anhydrides such as anhydrous oxalic acid, acetic anhydride, propionic anhydride, butyric anhydride, benzoic anhydride, maleic anhydride, phthalic anhydride, succinic anhydride, itaconic, anhydride, trimellitic anhydride, pyromellitic anhydride, malonic anhydride, methacrylic anhydride, formic anhydride, toluic anhydride, naphthalic anhydride, glutaric anhydride, trifluoroacetic anhydride, disulfuric acid, dinitrogen pentaoxide, diphosphoric acid, diphosphorus pentaoxide, phosphorus oxide, diarsenic pentoxide, diarsenic trioxide, methanesulfonic anhydride, acetic methanesulfonic anhydride, acetic ethanesulfonic anhydride, acetic propanesulfonic anhydride, propionic methanesulfonic anhydride, propionic ethanesulfonic anhydride, propionic propanesulfonic anhydride, 3-sulfopropionic anhydride, 2-methyl-3-sulfopropionic anhydride, 2,2-dimethyl-3-sulfopropionic anhydride, 2-ethyl-3-sulfopropionic anhydride, 2,2-diethyl-3-sulfopropionic anhydride, trifluoromethanesulfonic anhydride, and sulfobenzoic anhydride; and hydrolysates thereof. These may be used alone, or in a combination of two or more.

In particular, because the dehydrating agent might remain in the dry membrane after drying the paste and deteriorate battery performance, a compound whose molecular weight and/or whose boiling point can be lowered by hydrolysis is preferable as the dehydrating agent (E) used in the present invention, so that a part or all of the dehydrating agent can evaporate during the drying step.

The dehydrating agent (E) is preferably an acidic compound because the paste thickening inhibitory effect can be expected to be provided by neutralizing the acidic compound with a basic compound derived from an electrode active material. It is usually preferable that the dehydrating agent have a molecular weight of 300 or less, preferably 200 or less, and more preferably 120 or less. When the dehydrating agent is hydrolyzed (dewatered), the hydrolyzed dehydrating agent usually has a molecular weight of 150 or less, preferably 100 or less, and more preferably 70 or less. The dehydrating agent typically has a boiling point or a sublimation point of 200° C. or less, preferably 170° C. or less, and more preferably 150° C. or less.

Other Additives

The conductive paste for positive electrodes of lithium-ion batteries may contain components other than the above components (A), (B), (C), (D), and (E) (sometimes referred to as "other additives"). Examples of other additives include neutralizing agents, pigment dispersants, defoaming agents, antiseptic agents, anti-rust agents, plasticizers, binding agents (binders), and the like.

Examples of pigment dispersants and/or binding agents include acrylic resins, polyester resins, epoxy resins, polyether resins, alkyd resins, urethane resins, silicone resins, polycarbonate resins, silicate resins, chlorine-based resins, and fluorine-based resins, polyvinylpyrrolidone resins, polyvinyl alcohol resins, polyvinyl acetal resins, composite resins thereof, and the like, other than the resin (A) and polyvinylidene fluoride (B). These resins may be used alone, or in a combination of two or more.

Method for Producing the Conductive Paste for Positive Electrodes of Lithium-Ion Batteries of the Present Invention The total solids content of the dispersion resin (A) in the solids content of the conductive paste for positive electrodes of lithium-ion batteries of the present invention is usually 30 mass % or less, and preferably 20 mass % or less, in view of the viscosity at the time of dispersing a pigment, pigment dispersibility, dispersion stability, and production efficiency. In a preferable embodiment of the present invention, the total solids content of the dispersion resin (A) in the solids content of the conductive paste for positive electrodes of lithium-ion batteries of the present invention is usually 20 mass % or less, preferably 0.1 to 15 mass %, and more preferably 1.0 to 10 mass %, from the viewpoint of conductivity of a coating film.

The solids content of polyvinylidene fluoride (B) in the solids content of the conductive paste for positive electrodes of lithium-ion batteries of the present invention is usually 0.5 mass % or more and less than 30 mass %, preferably 3 mass % or more and less than 25 mass %, and more preferably 5 mass % or more and less than 20 mass %. The solids content of the conductive carbon (C) in the solids content of the conductive paste for positive electrodes of lithium-ion batteries of the present invention is usually 50 mass % or more and less than 100 mass %, preferably 60 mass % or more and less than 100 mass %, and more preferably 70 mass % or more and less than 100 mass %, in view of battery performance. Further, the content of the solvent (D) in the conductive paste for positive electrodes of lithium-ion batteries of the present invention is usually 50 mass % or more and less than 100 mass %, preferably 70 mass % or more and less than 100 mass %, and more preferably 80 mass % or more and less than 100 mass %, in view of drying efficiency and paste viscosity. It is usually preferable that the solids content of the dehydrating agent (E) in the solids content of the conductive paste for positive electrodes of lithium-ion batteries of the present invention is, based on the mass of polyvinylidene fluoride (B), 0.1 mass % or more and less than 10 mass %, preferably 0.5 mass % or more and less than 7 mass %, and more preferably 1 mass % or more and less than 5 mass %, in view of viscosity and storage stability. In the present invention, the conductive paste for positive electrodes of lithium-ion batteries preferably has a water content of less than 1.0 mass %, more preferably less than 0.6 mass %, and particularly preferably less than 0.4 mass %, in view of the viscosity and storage stability.

The conductive paste for positive electrodes of lithium-ion batteries of the present invention may be produced by uniformly mixing and dispersing each component described above by using, for example, a known dispersion device, such as a paint shaker, a sand mill, a ball mill, a pebble mill, an LMZ mill, a DCP pearl mill, a planetary ball mill, a homogenizer, a twin-screw kneader, and a thin-film spin system high-speed mixer. In the production of the conductive paste for positive electrodes of lithium-ion batteries in the present invention, mixing and/or pigment dispersion is preferably performed in an atmosphere at a dew point of 10° C. or less, more preferably 7° C. or less, and still more preferably 5° C. or less, from the viewpoint of the viscosity and storage stability. Preferably, as much water as possible is removed by using a dehydrating agent. However, due to water migration from the conductive paste or the atmosphere into the mixture paste, the paste more likely contains at least 0.01 mass % of water. Due to the facilities and production steps, the paste more likely contains 0.06 mass % of water or more. The conductive paste for positive electrodes of lithium-ion batteries of the present invention may contain a carbonyl-containing copolymer containing a vinylidene fluoride monomeric unit and an unsaturated dibasic acid monoester monomeric unit as disclosed in Patent Literature 6.

As described below, the conductive paste for positive electrodes of lithium-ion batteries of the present invention may be used to produce a mixture paste for positive electrodes of lithium-ion batteries by being mixed with an electrode active material.

Mixture Paste for Positive Electrodes of Lithium-Ion Batteries

The present invention further provides a mixture paste for positive electrodes of lithium-ion batteries obtained by further mixing an electrode active material with the conductive paste.

Electrode Active Material

Examples of electrode active materials include lithium nickel oxide ($LiNiO_2$), lithium manganese oxide ($LiMn_2O_4$), lithium cobalt oxide ($LiCoO_2$), lithium composite oxides, such as $LiNi_{1/3}Co_{1/3}Mn_{1/3}O_2$, and the like. These electrode active materials may be used alone, or in a combination of two or more. The solids content of the electrode active material in the solids content of the mixture paste for positive electrodes of lithium-ion batteries of the present invention is usually 70 mass % or more and less than 100 mass %, and preferably 80 mass % or more and less than 100 mass %, in view of battery capacity and battery resistance.

Method for Producing a Mixture Paste for Positive Electrodes of Lithium-Ion Batteries The mixture paste for positive electrodes of lithium-ion batteries of the present invention may be obtained by first preparing the conductive paste for positive electrodes of lithium-ion batteries described above, and then mixing an electrode active material with the conductive paste. The mixture paste for positive electrodes of lithium-ion batteries of the present invention may also be prepared by mixing the above-described component (A), component (B), component (C), and other materials such as component (D) and component (E) with an electrode active material.

The total solids content of the dispersion resin (A) in the solids content of the mixture paste for positive electrodes of lithium-ion batteries of the present invention is usually 0.001 to 20 mass %, and preferably 0.005 to 10 mass %, in view of battery performance and paste viscosity.

The solids content of polyvinylidene fluoride (B) in the mixture paste for positive electrodes of lithium-ion batteries of the present invention is usually 0.1 mass % or more and less than 3 mass %, preferably 0.5 mass % or more and less than 2.5 mass %, more preferably 1 mass % or more and less than 2 mass %. The solids content of the conductive carbon (C) in the solids content of the mixture paste for positive electrodes of lithium-ion batteries of the present invention is usually 0.01 to 30 mass %, preferably 0.05 to 20 mass %, and more preferably 0.1 to 15 mass %, in view of battery performance. Further, the content of the solvent (D) in the mixture paste for positive electrodes of lithium-ion batteries of the present invention is usually 0.1 to 60 mass %, preferably 0.5 to 50 mass %, and more preferably 1 to 45 mass %, in view of electrode drying efficiency and paste viscosity. The content of the dehydrating agent (E) in the solids content of the mixture paste for positive electrodes of lithium-ion batteries is usually 0.1 mass % or more and less than 10 mass %, preferably 0.5 mass % or more and less than 7 mass %, and more preferably 1 mass % and less than 5 mass %, based on the mass of polyvinylidene fluoride (B), from the viewpoint of the viscosity and storage stability. In the present invention, the content of lithium hydroxide in the mixture paste for positive electrodes of lithium-ion batteries is less than 1.5 mass %, more preferably less than 1 mass %, based on the mass of polyvinylidene fluoride (B), from the viewpoint of gelation prevention. In the present invention, the lithium hydroxide content can be measured by a method comprising diluting the mixture paste with an excess of deionized water and performing centrifugation, and then subjecting the supernatant to neutralization titration with an excess of hydrochloric acid.

In the mixture paste for positive electrodes of lithium-ion batteries of the present invention, the water content is preferably reduced as much as possible. The water content is preferably less than 1.0 mass %, more preferably less than 0.6 mass %, and particularly preferably less than 0.4 mass %. Due to water migration from the conductive paste or the atmosphere into the mixture paste, the paste more likely contains at least 0.01 mass % of water or more. Due to the facilities and production steps, the paste more likely contains at least 0.06 mass % of water or more.

The above water content refers to the amount of water contained in the mixture paste, and is not the amount of water contained in the positive electrode mixture layer, which is formed by drying the mixture paste. A part or all of the water contained in the mixture paste presumably evaporates during the step of drying the mixture paste.

Method for Producing an Electrode for Positive Electrodes of Lithium-Ion Batteries As described above, a positive electrode mixture layer of a lithium-ion secondary battery may be produced by applying a mixture paste for positive electrodes of lithium-ion batteries to a surface of a positive electrode core, followed by drying. The conductive paste for positive electrodes of lithium-ion batteries of the present invention can be used as a paste for forming a mixture layer. The conductive paste may also be used to form a primer layer between a positive electrode core and a synthesis layer.

The mixture paste for positive electrodes of lithium-ion batteries may be applied by using a known method that uses a die coater or the like. The amount of the mixture paste for positive electrodes of lithium-ion batteries to be applied is not particularly limited. For example, the amount may be determined to achieve a thickness of the positive electrode mixture layer after drying of 0.04 to 0.30 mm, and preferably 0.06 to 0.24 mm. The temperature of the drying step may be suitably determined, for example, within a range of 80 to 200° C., and preferably 100 to 180° C. The time for the drying step may be suitably determined, for example, within a range of 5 to 120 seconds, and preferably from 5 to 60 seconds. From the viewpoint of battery performance, evaporation or sublimation of as much dehydrating agent (E) contained in the mixture paste of the present invention as possible in the drying step is preferable so that the dehydrating agent (E) does not remain in the positive electrode mixture layer, which is a dry membrane.

EXAMPLES

The present invention is described in more detail below with reference to Production Examples, Examples, and Comparative Examples. However, the present invention is not limited to these Examples. In the following Examples, parts and percentages (%) are by mass.

Production of Pigment Dispersion Resins
Production of Polycyclic Aromatic Hydrocarbon Group-Containing Resin (A1)

Production Example 1

Three hundred parts of propylene glycol monomethyl ether was placed in a reactor equipped with a stirrer with a heater, and a condenser tube. After replacing the air with nitrogen gas, the reactor was maintained at 110° C. The following monomer mixture was added thereto dropwise over 3 hours.

Monomer Mixture

| | |
|---|---|
| 4-Hydroxy-1-naphthyl methacrylate | 300 parts |
| Styrene | 200 parts |
| n-Butyl acrylate | 300 parts |
| 2-Hydroxyethyl acrylate | 200 parts |
| 2,2'-Azobis(2-methylbutyronitrile) | 40 parts |

One hour after the completion of the dropwise addition, a solution obtained by dissolving 5 parts of 2,2'-azobis(2-methylbutyronitrile) in 100 parts of propylene glycol monomethyl ether was added thereto dropwise over 1 hour. After completion of the dropwise addition, the resulting mixture was maintained at 110° C. for another 1 hour, then discharged and dried with a hot-air dryer to finally obtain a polycyclic aromatic hydrocarbon group-containing Resin No. 1 with a solids content of 100%. The polycyclic aromatic hydrocarbon group-containing Resin No. 1 had a weight average molecular weight of 10,000.

Production Examples 2 to 7

Resin No. 2 to No. 10 solutions were produced by using the same composition and the same production method as in Production Example 1, except that the monomer composition of Production Example 1 was changed in types and amounts of the components as shown in the following Table 1.

TABLE 1

| | Production Example | | | | | | |
|---|---|---|---|---|---|---|---|
| | 1 | 2 | 3 | 4 | 5 | 6 | 7 |
| Resin | No. 1 | No. 2 | No. 3 | No. 4 | No. 5 | No. 6 | No. 7 |
| 4-Hydroxy-1-naphthyl methacrylate | 300 | | | | | 400 | |
| 4-Ethoxy-1-naphthyl acrylate | | 300 | | 400 | 400 | | |
| 2-Methoxy-4-hydroxy-1-naphthyl acrylate | | | 300 | | | | 400 |
| Styrene | 200 | 200 | 200 | 100 | 100 | 100 | 100 |
| n-Butyl acrylate | 300 | 300 | 300 | | | | |
| 2-Hydroxyethyl acrylate | 200 | 200 | 200 | 200 | 100 | 100 | 100 |
| N,N-Dimethylacrylamide | | | | 300 | | | |
| N-Hydroxyethyl acrylamide | | | | | 400 | 400 | |
| N-Ethyl-N-hydroxyethyl acrylamide | | | | | | | 400 |
| Molecular weight (Mw) | 10000 | 10000 | 10000 | 10000 | 10000 | 10000 | 10000 |

Production of Polyvinyl Alcohol Resin (A2a) Containing a Polymerizable Unsaturated Group-Containing Monomer (A2a-1)

Production Example 8

Using 90 parts by mass of vinyl acetate and 10 parts by mass of 2-butene-1,4-diol as polymerizable monomers, methanol as a solvent, and azobisisobutyronitrile as a polymerization initiator, a copolymerization reaction was performed at a temperature of about 60° C. in a reactor equipped with a thermometer, a reflux condenser, a nitrogen inlet, and a stirrer. Unreacted monomers were then removed under reduced pressure to obtain a resin solution. Subsequently, a solution of sodium hydroxide in methanol was added to perform a saponification reaction. After washing well, the resulting mixture was dried with a hot-air dryer. A polyvinyl alcohol resin No. 1 with a polymerization degree of 300, a saponification degree of 92 mol %, and a polymerizable unsaturated group-containing monomer (A2a-1) content of 10 mass % was obtained.

Production Example 9

Using 90 parts by mass of vinyl acetate and 10 parts by mass of 1-butene-3,4-diol as polymerizable monomers, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. Unreacted monomers were then removed under reduced pressure to obtain a resin solution. Subsequently, a solution of sodium hydroxide in methanol was added to perform a saponification reaction. After washing well, the resulting mixture was dried with a hot-air dryer. Finally, a polyvinyl alcohol resin No. 2 with a polymerization degree of 300, a saponification degree of 92 mol %, and a polymerizable unsaturated group-containing monomer (A2a-1) content of 10 mass % was obtained.

Production Example 10

Using 90 parts by mass of vinyl acetate and 10 parts by mass of 1-pentene-4,5-diol as polymerizable monomers, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. Unreacted monomers were removed under reduced pressure to obtain a resin solution. Subsequently, a solution of sodium hydroxide in methanol was added to perform a saponification reaction. After washing well, the resulting mixture was dried with a hot-air dryer. Finally, a polyvinyl alcohol resin No. 3 with a polymerization degree of 300, a saponification degree of 92 mol %, and a polymerizable unsaturated group-containing monomer (A2a-1) content of 10 mass % was obtained.

Production of Sulfonic Acid-Modified Polyvinyl Alcohol Resin (A2b)

Production Example 11

Using 97 parts by mass of vinyl acetate and 3.0 parts by mass of sodium allylsulfonate as polymerizable monomers, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. Unreacted monomers were then removed under reduced pressure to obtain a resin solution. Subsequently, a solution of sodium hydroxide in methanol was added to perform a saponification reaction. After washing well, the resulting mixture was dried with a hot-air dryer. Finally, a polyvinyl alcohol resin No. 4 with a polymerization degree of 300, a saponification degree of 92 mol %, and a sulfonic acid group-containing polymerizable unsaturated monomer content of 3.0 mass % was obtained.

Production of Polyvinyl Alcohol Resin (A2c)

Production Example 12

Using vinyl acetate as a polymerizable monomer, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. The unreacted monomer was then removed under reduced pressure to obtain a resin solution. Subsequently, a solution of sodium hydroxide in methanol was added to perform a saponification reaction. After washing well, the reaction mixture was dried with a hot-air dryer. Finally, a polyvinyl alcohol resin No. 5 with a polymerization degree of 500 and a saponification degree of 50 mol % was obtained.

Production Example 13

Using vinyl acetate as a polymerizable monomer, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. The unreacted monomer was then removed under reduced pressure to obtain a resin solution. Subsequently, a solution of sodium hydroxide in methanol was added to perform a saponification reaction. After washing well, the reaction mixture was dried with a hot-air dryer. Finally, a polyvinyl alcohol resin No. 6 with a polymerization degree of 500 and a saponification degree of 70 mol % was obtained.

Production Example 14

Using vinyl acetate as a polymerizable monomer, methanol as a solvent, and azobisisobutyronitrile as a polymerization initiator, a copolymerization reaction was performed at a temperature of about 60° C. in a reactor equipped with a thermometer, a reflux condenser, a nitrogen gas inlet tube, and a stirrer. The unreacted monomer was then removed under reduced pressure to obtain a resin solution. Subsequently, a solution of sodium hydroxide in methanol was added to perform a saponification reaction. After washing well, the reaction mixture was dried with a hot-air dryer. Finally, a polyvinyl alcohol resin No. 7 with a polymerization degree of 500 and a saponification degree of 90 mol % was obtained.

Conductive Paste Production

Example 1

Thirty parts (solids content: 30 parts) of polyvinyl alcohol resin No. 1 obtained in Production Example 1, 1200 parts of acetylene black, 220 parts of KF polymer W#7300 (trade name, polyvinylidene fluoride, produced by Kureha Corporation), 8500 parts of N-methyl-2-pyrrolidone, and 6 parts of diphosphorus pentoxide were mixed and dispersed using a ball mill for 5 hours to obtain Conductive paste X-1. The mixing, pigment dispersion, and discharge steps were performed in an atmosphere at a dew point of 4.5° C.

Examples 2 to 36 and Comparative Examples 1 to 3

Conductive pastes X-2 to X-39 were produced in the same manner as in Example 1, except that the composition of the conductive paste was changed as shown in the following Table 2. The amounts of resins shown in the table are based on a solids content.

The water contents shown in the table were measured using a Karl Fischer moisture analyzer (produced by Kyoto Electronics Manufacturing Co., Ltd., product name: MKC-610).

TABLE 2

| | | Example/Comparative Example Example | | | | | | | | | |
|---|---|---|---|---|---|---|---|---|---|---|---|
| | | 1 | 2 | 3 | 4 | 5 | 6 | 7 | 8 | 9 | 10 |
| | Conductive paste name | X-1 | X-2 | X-3 | X-4 | X-5 | X-6 | X-7 | X-8 | X-9 | X-10 |
| Resin (A2) | Polyvinyl alcohol resin No. 1 | 30 | | | | | | | | | |
| | Polyvinyl alcohol resin No. 2 | | 30 | 30 | 30 | | | | | | |
| | Polyvinyl alcohol resin No. 3 | | | | | 30 | | 24 | 24 | 24 | 24 |
| | Polyvinyl alcohol resin No. 4 | | | | | | 30 | | | | |
| | Polyvinyl alcohol resin No. 5 | | | | | | | 6 | | | |
| | Polyvinyl alcohol resin No. 6 | | | | | | | | 6 | | |
| | Polyvinyl alcohol resin No. 7 | | | | | | | | | 6 | 6 |
| Resin (A1) | Name of polycyclic aromatic ring-containing resin | | | | | | | | | | |
| | Amount of polycyclic aromatic ring-containing resin | | | | | | | | | | |
| Dehydrating agent | Dinitrogen pentoxide | 6 | 6 | | | 6 | 6 | 6 | 6 | 6 | |
| | Acetic anhydride | | | 6 | | | | | | | 6 |
| | Methanesulfonic anhydride | | | | 6 | | | | | | |
| | Anhydrous sodium sulfate | | | | | | | | | | |
| | Zeolite | | | | | | | | | | |
| | Ethyl orthoformate | | | | | | | | | | |
| Conductive Carbon | Acetylene black | 1200 | 1200 | 1200 | 1200 | 1200 | 1200 | 1200 | 1200 | 1200 | 1200 |
| | Graphite | | | | | | | | | | |
| | Polyvinylidene fluoride: KF polymer W#7300 | 220 | 220 | 220 | 220 | 220 | 220 | 220 | 220 | 220 | 220 |
| Solvent | N-methyl-2-pyrrolidone | 8500 | 8500 | 8500 | 8500 | 8500 | 8500 | 8500 | 8500 | 8500 | 8500 |
| | Water content (%) | 0.15 | 0.15 | 0.15 | 0.15 | 0.15 | 0.15 | 0.15 | 0.15 | 0.15 | 0.15 |
| | Dew point (° C.) | 4.5 | 4.5 | 4.5 | 4.5 | 4.5 | 4.5 | 4.5 | 4.5 | 4.5 | 4.5 |

| | | Example/Comparative Example Example | | | | | | | | | |
|---|---|---|---|---|---|---|---|---|---|---|---|
| | | 11 | 12 | 13 | 14 | 15 | 16 | 17 | 18 | 19 | 20 |
| | Conductive paste name | X-11 | X-12 | X-13 | X-14 | X-15 | X-16 | X-17 | X-18 | X-19 | X-20 |
| Resin (A2) | Polyvinyl alcohol resin No. 1 | | | | | | | | | | |
| | Polyvinyl alcohol resin No. 2 | | | | | | | | | | |
| | Polyvinyl alcohol resin No. 3 | 24 | | | | 24 | 18 | 18 | 18 | 18 | 18 |
| | Polyvinyl alcohol resin No. 4 | | | | | | | | | | |
| | Polyvinyl alcohol resin No. 5 | | | | | | | | | | |
| | Polyvinyl alcohol resin No. 6 | | | | | | | | 6 | | |
| | Polyvinyl alcohol resin No. 7 | 6 | | | | 6 | 6 | | | 6 | 6 |

TABLE 2-continued

| Resin (A1) | Name of polycyclic aromatic ring-containing resin | | No. 1 | No. 1 | No. 1 | No. 1 | No. 1 | No. 2 | No. 3 | No. 4 | No. 5 |
|---|---|---|---|---|---|---|---|---|---|---|---|
| | Amount of polycyclic aromatic ring-containing resin | | 30 | 30 | 30 | 6 | 6 | 6 | 6 | 6 | 6 |
| Dehydrating agent | Dinitrogen pentoxide | | | 6 | | | 6 | 6 | 6 | 6 | 6 | 6 |
| | Acetic anhydride | | | | 6 | | | | | | | |
| | Methanesulfonic anhydride | 6 | | | 6 | | | | | | |
| | Anhydrous sodium sulfate | | | | | | | | | | |
| | Zeolite | | | | | | | | | | |
| | Ethyl orthoformate | | | | | | | | | | |
| Conductive Carbon | Acetylene black | | 1200 | 1200 | 1200 | 1200 | 1200 | 1200 | 1200 | 1200 | 1200 |
| | Graphite | | | | | | | | | | |
| | Polyvinylidene fluoride: KF polymer W#7300 | | 220 | 220 | 220 | 220 | 220 | 220 | 220 | 220 | 220 |
| Solvent | N-methyl-2-pyrrolidone | | 8500 | 8500 | 8500 | 8500 | 8500 | 8500 | 8500 | 8500 | 8500 |
| | Water content (%) | | 0.15 | 0.15 | 0.15 | 0.15 | 0.15 | 0.15 | 0.15 | 0.15 | 0.15 |
| | Dew point (° C.) | | 4.5 | 4.5 | 4.5 | 4.5 | 4.5 | 4.5 | 4.5 | 4.5 | 4.5 |

| | | Example/Comparative Example — Example | | | | | | | | | |
|---|---|---|---|---|---|---|---|---|---|---|
| | | 21 | 22 | 23 | 24 | 25 | 26 | 27 | 28 | 29 | 30 |
| | Conductive paste name | X-21 | X-22 | X-23 | X-24 | X-25 | X-26 | X-27 | X-28 | X-29 | X-30 |
| Resin (A2) | Polyvinyl alcohol resin No. 1 | | | | | | | | | | |
| | Polyvinyl alcohol resin No. 2 | 18 | | | 18 | 18 | 18 | 18 | 18 | 18 | 18 |
| | Polyvinyl alcohol resin No. 3 | | 18 | | | | | | | | |
| | Polyvinyl alcohol resin No. 4 | | | 18 | | | | | | | |
| | Polyvinyl alcohol resin No. 5 | | | | | | | | | | |
| | Polyvinyl alcohol resin No. 6 | 6 | | | 6 | 6 | 6 | 6 | 6 | 6 | 6 |
| | Polyvinyl alcohol resin No. 7 | | 6 | 6 | | | | | | | |
| Resin (A1) | Name of polycyclic aromatic ring-containing resin | No. 6 | No. 7 | No. 7 | No. 7 | No. 7 | No. 6 | No. 6 | No. 6 | No. 6 | No. 6 |
| | Amount of polycyclic aromatic ring-containing resin | 6 | 6 | 6 | 6 | 6 | 6 | 6 | 6 | 6 | 6 |
| Dehydrating agent | Dinitrogen pentoxide | 6 | 6 | 6 | 2 | 12 | | | | | |
| | Acetic anhydride | | | | | | 6 | | | | |
| | Methanesulfonic anhydride | | | | | | | 6 | | | |
| | Anhydrous sodium sulfate | | | | | | | | 6 | | |
| | Zeolite | | | | | | | | | 6 | |
| | Ethyl orthoformate | | | | | | | | | | 6 |
| Conductive Carbon | Acetylene black | 1200 | 1200 | 1200 | 1200 | 1200 | 1200 | 1200 | 1200 | 1200 | 1200 |
| | Graphite | | | | | | | | | | |
| | Polyvinylidene fluoride: KF polymer W#7300 | 220 | 220 | 220 | 220 | 220 | 220 | 220 | 220 | 220 | 220 |
| Solvent | N-methyl-2-pyrrolidone | 8500 | 8500 | 8500 | 8500 | 8500 | 8500 | 8500 | 8500 | 8500 | 8500 |
| | Water content (%) | 0.15 | 0.15 | 0.15 | 0.2 | 0.1 | 0.15 | 0.15 | 0.15 | 0.15 | 0.15 |
| | Dew point (° C.) | 4.5 | 4.5 | 4.5 | 4.5 | 4.5 | 4.5 | 4.5 | 4.5 | 4.5 | 4.5 |

| | | Example/Comparative Example | | | | | | | | |
|---|---|---|---|---|---|---|---|---|---|---|
| | | Example | | | | | | Comp. Ex. | | |
| | | 31 | 32 | 33 | 34 | 35 | 36 | 1 | 2 | 3 |
| | Conductive paste name | X-31 | X-32 | X-33 | X-34 | X-35 | X-36 | X-37 | X-38 | X-39 |
| Resin (A2) | Polyvinyl alcohol resin No. 1 | | | | | | | | | |
| | Polyvinyl alcohol resin No. 2 | | | | | | | | | |
| | Polyvinyl alcohol resin No. 3 | 18 | 18 | 18 | 18 | 18 | 18 | 18 | | |
| | Polyvinyl alcohol resin No. 4 | | | | | | | | | |
| | Polyvinyl alcohol resin No. 5 | | | | | | | | | 30 |
| | Polyvinyl alcohol resin No. 6 | | | | | | | | 30 | |
| | Polyvinyl alcohol resin No. 7 | 6 | 6 | 6 | 6 | 6 | 6 | 6 | | |

TABLE 2-continued

| Resin (A1) | Name of polycyclic aromatic ring-containing resin | No. 7 | No. 7 | No. 7 | No. 7 | No. 5 | No. 5 | No. 5 | | |
|---|---|---|---|---|---|---|---|---|---|---|
| | Amount of polycyclic aromatic ring-containing resin | 6 | 6 | 6 | 6 | 6 | 6 | 6 | | |
| Dehydrating agent | Dinitrogen pentoxide | 6 | 6 | 6 | 6 | 6 | 6 | | | |
| | Acetic anhydride | | | | | | | | | |
| | Methanesulfonic anhydride | | | | | | | | | |
| | Anhydrous sodium sulfate | | | | | | | | | |
| | Zeolite | | | | | | | | | |
| | Ethyl orthoformate | | | | | | | | | |
| Conductive Carbon | Acetylene black | 600 | | 1200 | 1200 | 1200 | 1200 | 1200 | 1200 | 1200 |
| | Graphite | 600 | 1200 | | | | | | | |
| | Polyvinylidene fluoride: KF polymer W#7300 | 220 | 220 | 220 | 220 | 220 | 220 | 220 | 220 | 220 |
| Solvent | N-methyl-2-pyrrolidone | 8500 | 8500 | 8500 | 8500 | 8500 | 8500 | 8500 | 8500 | 8500 |
| | Water content (%) | 0.15 | 0.15 | 0.6 | 1.0 | 0.15 | 0.15 | 0.3 | 0.3 | 1.0 |
| | Dew point (° C.) | 4.5 | 4.5 | 7.0 | 11.0 | 4.5 | 4.5 | 4.5 | 4.5 | 10.0 |

Mixture Paste Production

Example 37

Eight parts of Conductive paste X-1 obtained in Example 1, 90 parts of active material particles (lithium-nickel manganese oxide particles with a spinel structure represented by the compositional formula: $LiNi_{0.5}Mn_{1.5}O_4$; average particle diameter: 6 μm; BET specific surface area: 0.7 m$^2$/g), and 57 parts of N-methyl-2-pyrrolidone were mixed to produce Mixture paste Y-1.

Examples 38 to 72 and Comparative Examples 4 to 6

Mixture pastes Y-2 to Y-39 were produced in the same manner as in Example 37, except that the type of the conductive paste was changed as shown in Table 3 below. Table 3 below shows the lithium hydroxide content of each mixture paste (mass % based on the mass of vinylidene fluoride), and the results of evaluation tests described later (viscosity of conductive paste, storage stability of the mixture paste, and battery performance). If the results of at least one of the three evaluation tests were "fail," then the conductive paste and mixture paste were evaluated as "fail."

TABLE 3

| | | Example/Comparative Example Example | | | | | | | | | |
|---|---|---|---|---|---|---|---|---|---|---|---|
| | | 37 | 38 | 39 | 40 | 41 | 42 | 43 | 44 | 45 | 46 |
| Mixture paste name | | Y-1 | Y-2 | Y-3 | Y-4 | Y-5 | Y-6 | Y-7 | Y-8 | Y-9 | Y-10 |
| Conductive paste name | | X-1 | X-2 | X-3 | X-4 | X-5 | X-6 | X-7 | X-8 | X-9 | X-10 |
| Lithium hyroxide (mass %) | | 0.8 | 0.8 | 0.8 | 0.8 | 0.8 | 08 | 08 | 0.8 | 0.8 | 0.8 |
| Evaluation | Viscosity | B | B | B | B | B | B | A | A | A | A |
| | Storage stability | S | S | S | S | S | S | S | S | S | S |
| | Battery performance | C | B | B | B | B | B | A | A | A | A |

| | | Example/Comparative Example Example | | | | | | | | | |
|---|---|---|---|---|---|---|---|---|---|---|---|
| | | 47 | 48 | 49 | 50 | 51 | 52 | 53 | 54 | 55 | 56 |
| Mixture paste name | | Y-11 | Y-12 | Y-13 | Y-14 | Y-15 | Y-16 | Y-17 | Y-18 | Y-19 | Y-20 |
| Conductive paste name | | X-11 | X-12 | X-13 | X-14 | X-15 | X-16 | X-17 | X-18 | X-19 | X-20 |
| Lithium hyroxide (mass %) | | 0.8 | 0.8 | 0.8 | 0.8 | 0.8 | 0.8 | 0.8 | 0.8 | 0.8 | 0.8 |
| Evaluation | Viscosity | A | B | B | B | A | A | A | A | S | S |
| | Storage stability | S | S | S | S | S | S | S | S | S | S |
| | Battery performance | A | B | B | B | A | S | S | S | S | S |

| | | Example/Comparative Example Example | | | | | | | | | |
|---|---|---|---|---|---|---|---|---|---|---|---|
| | | 57 | 58 | 59 | 60 | 61 | 62 | 63 | 64 | 65 | 66 |
| Mixture paste name | | Y-21 | Y-22 | Y-23 | Y-24 | Y-25 | Y-26 | Y-27 | Y-28 | Y-29 | Y-30 |
| Conductive paste name | | X-21 | X-22 | X-23 | X-24 | X-25 | X-26 | X-27 | X-28 | X-29 | X-30 |
| Lithium hydroxide (mass %) | | 0.8 | 0.8 | 0.8 | 0.8 | 0.8 | 0.8 | 0.8 | 0.8 | 0.8 | 0.8 |
| Evaluation | Viscosity | S | S | S | S | S | S | S | S | S | S |
| | Storage stability | S | S | S | A | S | S | S | B | B | A |
| | Battery performance | S | S | S | S | A | S | S | B | A | S |

TABLE 3-continued

| | Example/Comparative Example | | | | | | | | |
|---|---|---|---|---|---|---|---|---|---|
| | Example | | | | | | Comp. Ex. | | |
| | 67 | 68 | 69 | 70 | 71 | 72 | 4 | 5 | 6 |
| Mixture paste name | Y-31 | Y-32 | Y-33 | Y-34 | Y-35 | Y-36 | Y-37 | Y-38 | Y-39 |
| Conductive paste name | X-31 | X-32 | X-33 | X-34 | X-35 | X-36 | X-37 | X-38 | X-39 |
| Lithium hydroxide (mass %) | 0.8 | 0.8 | 0.8 | 0.8 | 1.2 | 1.6 | 0.8 | 0.8 | 1.6 |
| Evaluation Viscosity | A | A | A | B | A | B | B | B | D |
| Storage stability | S | S | B | C | B | C | D | D | D |
| Battery performance | S | A | A | B | A | B | B | C | D |

Evaluation Tests

Viscosity

The viscosity of the conductive pastes obtained in the Examples and Comparative Examples was measured using a cone and plate viscometer Mars2 (trade name, produced by Haake) at a shear rate of 1.0 sec$^{-1}$, and evaluated according to the following criteria. As the evaluation, S, A, B, and C were pass, and D was fail.

S: The viscosity was less than 1 Pa·s.
A: The viscosity was 1 Pa·s or more and less than 5 Pa·s.
B: The viscosity was 5 Pa·s or more and less than 30 Pa·s.
C: The viscosity was 30 Pa·s or more and less than 100 Pa·s.
D: The viscosity was 100 Pa·s or more.

Storage Stability (Viscosity Increase Percentage)

The mixture pastes obtained in the Examples and the Comparative Examples were stored at a temperature of 25° C. for 2 days. The initial viscosity and the viscosity after storage were compared. The viscosity was measured using a cone and plate viscometer "Mars2" (trade name, produced by Haake) at a shear rate of 1.0 sec$^{-1}$, and the viscosity increase (%) was evaluated according to the following criteria. As the evaluation, S, A, B, and C were pass, and D was fail.

Viscosity increase (%)=(Viscosity after storage/Initial viscosity)×100−100

S: The viscosity increase (%) after storage was less than 10%.
A: The viscosity increase (%) after storage was 10% or more and less than 50%.
B: The viscosity increase (%) after storage was 50% or more and less than 100%.
C: The viscosity increase (%) after storage was 100% or more and less than 200%.
D: The viscosity increase (%) after storage was less than 200%.

Battery Performance (IV Resistance Increase Percentage)

The battery performance (IV resistance increase percentage) was evaluated using the mixture pastes obtained in the Examples and Comparative Examples. The evaluation method was performed in accordance with the following procedure.

(1) Conductive pastes and mixture pastes were produced in accordance with the method described in the "Production of Conductive Pastes and Mixture Pastes Used as Blank Samples" section below. Then, lithium-ion secondary batteries each comprising a positive electrode and a negative electrode were constructed with the methods described in the "Production of Positive Electrode," "Production of Negative Electrode," and "Construction of Lithium-Ion Secondary Battery" sections below. Subsequently, the IV resistance was measured using the obtained lithium-ion secondary batteries in accordance with the "IV Resistance Measurement Method" below.

(2) Lithium-ion secondary batteries each comprising a positive electrode and a negative electrode were constructed in the same manner as in (1) above except that Mixture pastes Y-1 to Y-39 obtained in the Examples and Comparative Examples were used in place of the mixture pastes prepared as blank samples. Then, the IV resistance was measured. Subsequently, the IV resistance increase percentages (%) were calculated with respect to the blank samples and evaluated. Since three different types of conductive carbon (acetylene black alone, a combination of acetylene black and graphite, and graphite alone) were used, a comparison was made with respect to blank samples of the same type of pigment (mixture paste Y-31 was evaluated in comparison with a blank sample comprising 600 parts of acetylene black and 600 parts of graphite, mixture paste Y-32 was evaluated in comparison with a blank sample comprising 1200 parts of graphite, and the other mixture pastes were evaluated in comparison with a blank sample comprising 1200 parts of acetylene black). The battery performance (IV resistance increase percentage) was evaluated in accordance with the following criteria. S, A, B, and C were evaluated as "pass," and D was evaluated as "fail."

S: The IV resistance increase percentage was less than +3%, compared with the blank sample.
A: The IV resistance increase percentage was +3% or more and less than +4.5%, compared with the blank sample.
B: The IV resistance increase percentage was +4.5% or more and less than +6%, compared with the blank sample.
C: The IV resistance increase percentage was +6% or more and less than +8%, compared with the blank sample.
D: The IV resistance increase percentage was +8% or more, compared with the blank sample.

Production of Conductive Pastes and Mixture Pastes Used as Blank Samples

One thousand and two hundred parts of acetylene black, 220 parts of KE polymer W#7300 (trade name, polyvinylidene fluoride, produced by Kureha Corporation), and 8500 parts of N-methyl-2-pyrrolidone were mixed and dispersed using a ball mill for 5 hours to obtain a dispersant- and polymerization inhibitor-free conductive paste (each step was performed in an atmosphere at a dew point of 4.5° C.).

Eight parts of the conductive paste obtained above, 90 parts of active material particles (lithium-nickel manganese oxide particles with a spinel structure represented by the compositional formula: $LiNi_{0.5}Mn_{1.5}O_4$; average particle diameter: 6 μm; BET specific surface area: 0.7 m$^2$/g), and 57 parts of N-methyl-2-pyrrolidone were mixed to obtain a dispersant- and polymerization inhibitor-free mixture paste to be used as a blank sample. Additionally, blank samples were produced using 600 parts of acetylene black and 600 parts of graphite, or 1200 parts of graphite, in place of 1200 parts of acetylene black (three types of blank samples were produced: acetylene black alone, a combination of acetylene black and graphite, and graphite alone).

Production of Positive Electrode

The mixture paste was applied in a strip to both surfaces of an elongated aluminum foil having an average thickness of about 15 μm (positive electrode collector) in a coating weight of 10 mg/cm$^2$ (based on solids content) per one surface by a roller coating method, and dried (at a drying temperature of 80° C. for 1 minute) to form a positive-electrode-active-material layer. The positive-electrode-active-material layer supported on the positive electrode collector was pressed using a roll press, thereby adjusting the properties.

Production of Negative Electrode

A natural graphite powder (C, average particle diameter: 5 μm; specific surface area: 3 m$^2$/g) as a negative electrode active material, a styrene-butadiene rubber (SBR) as a binder, and carboxymethyl cellulose (CMC) as a thickener were mixed with ion exchanged water, so that the mass ratio of these materials was C:SBR:CMC=98:1:1, and the solids concentration was about 45 mass %, thereby preparing a slurry for forming a negative-electrode-active-material layer. This slurry was applied in a strip to both surfaces of an elongated copper foil having an average thickness of about 10 μm (positive electrode collector) in a coating weight of 7 mg/cm$^2$ (based on solids content) per one surface by a roller coating method, and dried (at a drying temperature of 120° C. for 1 minute) to form a negative-electrode-active-material layer. The resulting product was pressed using a roll press, thereby adjusting the properties.

Construction of Lithium-Ion Secondary Battery

The positive electrode sheet and the negative electrode sheet produced above were disposed facing each other via a separator sheet (a three-layered structure with a thickness of 20 μm in which polypropylene (PP) is laminated on both surfaces of polyethylene (PE)), and elliptically wound to prepare a wound electrode body. The produced electrode body was disposed in a cylindrical battery case, to which a non-aqueous electrolyte solution (obtained by dissolving LiPF$_6$ as a supporting salt at a concentration of 1.0 mol/L in a mixed solvent containing ethylene carbonate (EC), dimethyl carbonate (DMC), and ethylmethyl carbonate (EMC) at a volume ratio of EC:DMC:EMC=3:4:3) was introduced. Then, a positive-electrode terminal and a negative-electrode terminal were welded to the positive electrode collector and negative electrode collector exposed at the end of the electrode body, and the battery case was sealed to construct an 18650-type lithium-ion secondary battery.

IV Resistance Measurement Method

The IV resistance of a cell for evaluation with a state-of-charge (SOC) of 60% was measured in an environment at −30° C. The IV resistance here was measured as follows: a constant current discharge at a previously determined electric current value (I) was performed for 10 seconds, and a voltage (V) after the current discharge was measured. The previously determined electric current values (I) were plotted on the X-axis, while the voltage (V) after each current discharge was plotted on the Y-axis. Then, an approximate straight line was drawn based on the plot obtained by each current discharge, and its slope was considered the IV resistance. The IV resistance (mΩ) here was calculated based on the voltages (V) obtained after discharges at constant current values of 0.3 C, 1 C, and 3 C.

The invention claimed is:

1. A conductive paste for positive electrodes of lithium-ion batteries comprising a dispersion resin (A), polyvinylidene fluoride (B), conductive carbon (C), a solvent (D), and a dehydrating agent (E),
   wherein the solvent (D) comprises N-methyl-2-pyrrolidone.

2. The conductive paste for positive electrodes of lithium-ion batteries according to claim 1, wherein the dehydrating agent (E) has a boiling point or sublimation point of 200° C. or less.

3. The conductive paste for positive electrodes of lithium-ion batteries according to claim 1, wherein the dispersion resin (A) comprises a polycyclic aromatic hydrocarbon group-containing resin (A1).

4. The conductive paste for positive electrodes of lithium-ion batteries according to claim 1, wherein the dispersion resin (A) comprises a polyvinyl alcohol resin (A2).

5. The conductive paste for positive electrodes of lithium-ion batteries according to claim 1, wherein the conductive carbon (C) comprises acetylene black.

6. The conductive paste for positive electrodes of lithium-ion batteries according to claim 1, wherein the conductive carbon (C) comprises graphite.

7. The conductive paste for positive electrodes of lithium-ion batteries according to claim 1, wherein the dehydrating agent (E) is an acidic compound.

8. The conductive paste for positive electrodes of lithium-ion batteries according to claim 1, wherein the conductive paste has a water content of less than 1.0 mass %.

9. A method for producing the conductive paste for positive electrodes of lithium-ion batteries according to claim 1, comprising mixing and/or dispersing a pigment in an atmosphere at a dew point of 10° C. or less.

10. A mixture paste for positive electrodes of lithium-ion batteries comprising the conductive paste according to claim 1 and an electrode active material mixed with the conductive paste.

11. The mixture paste for positive electrodes of lithium-ion batteries according to claim 10, wherein the mixture paste has a lithium hydroxide content of less than 1.5 mass %, based on the mass of the polyvinylidene fluoride (B).

12. An electrode for positive electrodes of lithium-ion batteries obtained by using the mixture paste for positive electrodes of lithium-ion batteries according to claim 10.

13. A lithium ion battery comprising the electrode for positive electrodes of lithium-ion batteries according to claim 12.

* * * * *